United States Patent
Aiba et al.

(10) Patent No.: US 10,085,239 B2
(45) Date of Patent: *Sep. 25, 2018

(54) MOBILE COMMUNICATION SYSTEM, MOBILE STATION APPARATUS, BASE STATION APPARATUS, COMMUNICATION METHOD AND INTEGRATED CIRCUIT

(71) Applicant: SHARP KABUSHIKI KAISHA, Sakai, Osaka (JP)

(72) Inventors: Tatsushi Aiba, Sakai (JP); Shoichi Suzuki, Sakai (JP); Daiichiro Nakashima, Sakai (JP); Wataru Ouchi, Sakai (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/689,674

(22) Filed: Aug. 29, 2017

(65) Prior Publication Data

US 2017/0367076 A1    Dec. 21, 2017

Related U.S. Application Data

(63) Continuation of application No. 13/824,239, filed as application No. PCT/JP2011/072311 on Sep. 29, 2011, now Pat. No. 9,781,703.

(30) Foreign Application Priority Data

Sep. 29, 2010    (JP) ................. 2010-218023

(51) Int. Cl.
*H04W 4/00*    (2018.01)
*H04W 72/04*    (2009.01)
(Continued)

(52) U.S. Cl.
CPC .......... *H04W 72/04* (2013.01); *H04L 1/1861* (2013.01); *H04L 5/001* (2013.01); *H04L 5/0032* (2013.01);
(Continued)

(58) Field of Classification Search
CPC ..... H04W 72/04; H04W 72/00; H04W 88/08; H04L 1/1861; H04L 5/001; H04L 5/0032; H04L 5/0055
See application file for complete search history.

(56) References Cited

U.S. PATENT DOCUMENTS 8,213,378 B2   7/2012   Chen et al.
8,243,669 B2   8/2012   Chen et al.
(Continued)

FOREIGN PATENT DOCUMENTS

JP    2010-527567 A    8/2010
WO    WO 2009/057286 A1   5/2009
(Continued)

OTHER PUBLICATIONS

3GPP TR 36.814 V9.0.0, "3rd Generation Partnership Project; Technical Specification Group Radio Access Network; Evolved Universal Terrestrial Radio Access (E-UTRA); Further advancements for E-UTRA physical layer aspects (Release 9)" Technical Report, (Mar. 2010).
(Continued)

*Primary Examiner* — Abdelnabi O Musa
(74) *Attorney, Agent, or Firm* — Birch, Stewart, Kolasch & Birch, LLP

(57) ABSTRACT

A mobile communication system and a communication method are provided in which, a base station apparatus can efficiently allocate, to a mobile station apparatus, an uplink resource for transmitting information indicating an ACK/NACK for downlink data. The mobile station apparatus that
(Continued)

communicates with the base station apparatus, comprising: a scheduling unit configured to determine two physical uplink control channel resources for a transmission using a physical downlink shared channel in a case that a downlink transmission mode that supports the transmission of up to two downlink transport blocks using the physical downlink shared channel is configured for the secondary cell, and a physical downlink control channel that indicates the transmission using the physical downlink shared channel on the secondary cell is detected on the secondary cell.

12 Claims, 12 Drawing Sheets

(51) Int. Cl.
  *H04L 5/00* (2006.01)
  *H04L 1/18* (2006.01)
  *H04W 72/00* (2009.01)
  *H04W 88/08* (2009.01)

(52) U.S. Cl.
  CPC .......... *H04L 5/0053* (2013.01); *H04L 5/0055* (2013.01); *H04L 5/0094* (2013.01); *H04L 5/0057* (2013.01); *H04W 72/00* (2013.01); *H04W 88/08* (2013.01)

(56) References Cited

U.S. PATENT DOCUMENTS

| | | |
|---|---|---|
| 2009/0247174 A1 | 10/2009 | Zhang et al. |
| 2009/0303956 A1 | 12/2009 | Chen et al. |
| 2010/0027471 A1 | 2/2010 | Palanki et al. |
| 2010/0135237 A1 | 6/2010 | Papasakellariou et al. |
| 2010/0232388 A1 | 9/2010 | Nakao et al. |
| 2010/0272048 A1 | 10/2010 | Pan et al. |
| 2010/0275083 A1* | 10/2010 | Nam .................. H03M 13/6306 714/748 |
| 2011/0126071 A1 | 5/2011 | Han et al. |
| 2011/0134747 A1 | 6/2011 | Kwon et al. |
| 2011/0134968 A1 | 6/2011 | Han et al. |
| 2011/0142000 A1 | 6/2011 | Han et al. |
| 2011/0170489 A1 | 7/2011 | Han et al. |
| 2011/0194516 A1 | 8/2011 | Aiba et al. |
| 2011/0205994 A1 | 8/2011 | Han et al. |
| 2011/0216733 A1 | 9/2011 | Han et al. |
| 2011/0228877 A1 | 9/2011 | Han et al. |
| 2011/0280203 A1 | 11/2011 | Han et al. |
| 2012/0002631 A1 | 1/2012 | Nishio et al. |
| 2012/0008577 A1 | 1/2012 | Han et al. |
| 2012/0044903 A1 | 2/2012 | Chen et al. |
| 2012/0093090 A1 | 4/2012 | Han et al. |
| 2012/0140712 A1 | 6/2012 | Yamada et al. |
| 2012/0170533 A1 | 7/2012 | Ahn et al. |
| 2012/0275395 A1 | 11/2012 | Gerstenberger et al. |
| 2014/0029565 A1* | 1/2014 | Kim .................. H04L 5/001 370/329 |
| 2015/0312013 A1* | 10/2015 | Xu .................. H04L 1/0618 370/329 |

FOREIGN PATENT DOCUMENTS

| | | |
|---|---|---|
| WO | WO 2009/120888 A2 | 10/2009 |
| WO | WO 2010/014969 A1 | 2/2010 |
| WO | WO 2010/018980 A2 | 2/2010 |
| WO | WO 2010/027035 A1 | 3/2010 |
| WO | WO 2010/106786 A1 | 9/2010 |

OTHER PUBLICATIONS

3GPP TSG RAN WG1 Meeting #62, R1-104926, "Mapping Table for Rel. 10 Channel Selection for CA", NTT DOCOMO, Agenda item: 6.2.2.1, pp. 1-5, Aug. 23-27, 2010.

Huawei, "Resource Allocation for Uplink ACK/NACK Multiplexing", 3GPP TSG RAN WG1 Meeting #62, R1-104282, Madrid, Spain, Aug. 23-27, 2010, 5 pages.

International Search Report, dated Jan. 10, 2012, issued in PCT/JP2011/072311.

Qualcomm Incorporated, "Number Of Bits Conveyed on Multi-bit-ACK PUCCH Format", 3GPP TSG-RAN WG1 #62, R1-104782, Aug. 23-27, 2010, Madrid, Spain, 6 pages.

Texas Instruments, "Resource Allocation for A/N Transmission on PUCCH", 3GPP TSG RAN WG1 #62, R1-104466, Madrid, Spain, Aug. 23-27, 2010, 4 pages.

TSG-RAN WG1 #53bis,R1-082468, "Carrier aggregation in LTE-Advanced", Ericsson, Agenda Item: 12, Jun. 30-Jul. 4, 2008.

Written Opinion of the International Searching Authority, dated Jan. 10, 2012, issued in PCT/JP2011/072311.

Advisory Action issued in copending U.S. Appl. No. 13/824,239, dated on Oct. 7, 2016.

Final Office Action issued in copending U.S. Appl. No. 13/824,239, dated on Dec. 24, 2014.

Final Office Action issued in copending U.S. Appl. No. 13/824,239, dated on May 19, 2016.

Non-Final Office Action issued in copending U.S. Appl. No. 13/824,239, dated on Aug. 25, 2014.

Non-Final Office Action issued in copending U.S. Appl. No. 13/824,239, dated on Feb. 1, 2016.

Notice of Allowance issued in copending U.S. Appl. No. 13/824,239, dated on Jun. 5, 2017.

\* cited by examiner

FIG. 5

| FIRST ACK/NACK | SECOND ACK/NACK | THIRD ACK/NACK | FOURTH ACK/NACK | RESOURCE (PUCCH RESOURCE) | QPSK SIGNAL |
|---|---|---|---|---|---|
| ACK | NACK | NACK | NACK | RESOURCE1 | 00 |
| NACK | NACK | NACK | NACK | RESOURCE1 | 11 |
| ACK | NACK | ACK | ACK | RESOURCE1 | 01 |
| ACK | ACK | ACK | NACK | RESOURCE1 | 10 |
| ACK | ACK | NACK | NACK | RESOURCE2 | 00 |
| NACK | ACK | NACK | NACK | RESOURCE2 | 11 |
| ACK | ACK | ACK | ACK | RESOURCE2 | 01 |
| NACK | ACK | ACK | ACK | RESOURCE2 | 10 |
| ACK | NACK | ACK | NACK | RESOURCE3 | 00 |
| NACK | NACK | ACK | NACK | RESOURCE3 | 11 |
| NACK | NACK | ACK | ACK | RESOURCE3 | 01 |
| NACK | ACK | ACK | NACK | RESOURCE3 | 10 |
| ACK | NACK | NACK | ACK | RESOURCE4 | 00 |
| NACK | NACK | NACK | ACK | RESOURCE4 | 11 |
| ACK | ACK | NACK | ACK | RESOURCE4 | 01 |
| NACK | ACK | NACK | ACK | RESOURCE4 | 10 |

MOBILE COMMUNICATION SYSTEM, MOBILE STATION APPARATUS, BASE STATION APPARATUS, COMMUNICATION METHOD AND INTEGRATED CIRCUIT

CROSS-REFERENCE TO RELATED APPLICATIONS

This application is a Continuation of copending application Ser. No. 13/824,239, filed on Apr. 11, 2013, which was filed as PCT International Application No. PCT/JP2011/072311 on Sep. 29, 2011, which claims the benefit under 35 U.S.C. § 119(a) to Patent Application No. 2010-218023, filed in Japan on Sep. 29, 2010, all of which are hereby expressly incorporated by reference into the present application.

TECHNICAL FIELD

The present invention relates to a mobile communication system that includes a base station apparatus and a mobile station apparatus, a communication method and an integrated circuit.

BACKGROUND ART

3GPP (3rd Generation Partnership Project) is a project that examines and produces the specifications of a mobile communication system based on a network in which W-CDMA (Wideband-Code Division Multiple Access) and GSM (Global System for Mobile Communications) are developed. In the 3GPP, the W-CDMA system is standardized as a third-generation cellular mobile communication system, and its serves have been launched one after another. Moreover, HSDPA (High-speed Downlink Packet Access) in which its communication speed is further increased is also standardized, and its serves have been launched. In the 3GPP, a mobile communication system (hereinafter referred to as "LTE-A (Long Term Evolution-Advanced" or "Advanced-EUTRA") is being examined which utilizes evolution of a third-generation radio access technology (hereinafter referred to as "LTE (Long Term Evolution" or "EUTRA (Evolved Universal Terrestrial Radio Access") and a wider frequency band to realize higher-speed data transmission/reception.

As the communication system of the LTE, an OFDMA (Orthogonal Frequency Division Multiple Access) system in which subcarriers orthogonal to each other are used to perform user multiplexing and an SC-FDMA (Single Carrier-Frequency Division Multiple Access) system are being examined. In other words, in the downlink, the OFDMA system, which is a multicarrier communication system, is proposed, and in the uplink, the SC-FDMA system, which is a single carrier communication system, is proposed.

As the communication system of the LTE-A, in the downlink, the introduction of the OFDMA system is being examined, and in the uplink, in addition to the SC-FDMA system, the introduction of a Clustered-SC-FDMA (Clustered-Single Carrier-Frequency Division Multiple Access; which is also referred to as a DFT-s-OFDM with Spectrum Division Control or a DFT-precoded OFDM) is being examined. In the LTE and the LTE-A, the SC-FDMA system and the Clustered-SC-FDMA system proposed as the uplink communication system, according to characteristics of a single carrier communication system (single carrier characteristics), can suppress low a PAPR (Peak to Average Power Ratio: transmission power) when data (information) is transmitted.

Moreover, in the LTE-A, an examination is being performed in which a plurality of frequency bands that has the same channel structure as the LTE and is contiguous and/or non-contiguous (which can be referred to as a carrier) (hereinafter referred to as a "Cell" or a "Component Carrier (CC)") is compositely used and is utilized as one wide frequency band (referred to as Cell aggregation or Carrier aggregation). Furthermore, in order for a base station apparatus and a mobile station apparatus to more flexibly use a wide frequency band to perform communication, it is proposed that a frequency band used for downlink communication and a frequency band used for uplink communication are made different in frequency bandwidth (Asymmetric cell aggregation or Asymmetric carrier aggregation) (Non-patent document 1).

Furthermore, in the LTE-A, it is proposed that the mobile station apparatus applies MIMO SM (Multiple Input Multiple Output Spatial Multiplexing) to transmit Downlink Transport Block (Downlink TB) to the mobile station apparatus (Non-patent document 2). Here, the MIMO SM refers to a technology in which a plurality of signals is multiplexed and transmitted/received for the channels of a plurality of spatial dimensions realized by a plurality of transmission antenna ports and a plurality of reception antenna ports. Here, the antenna port refers to a logical antenna used for signal processing, and one antenna port may be formed with one physical antenna or may be formed with a plurality of physical antennas. In addition, one transmission antenna port may correspond to one reference signal.

For example, the base station apparatus applies the MIMO SM to a Physical Downlink Shared Channel (PDSCH), and thereby can transmit transport blocks for a plurality of (for example, up to two) downlink shared channels (DL-SCHs) to the mobile station apparatus. In other words, the base station apparatus applies the MIMO SM to the PDSCH, and thereby performs transmission to the mobile station apparatus with a plurality of (for example, two) Code Words (CWs).

Furthermore, in the LTE-A, as a method of the mobile station apparatus to transmit, to the base station apparatus, information indicating an ACK/NACK (Positive Acknowledgement/Negative Acknowledgement, an ACK signal or a NACK signal) in a HARQ for the downlink transport block, the transmission of the information indicating the ACK/NACK by Channel Selection is proposed (Non-patent document 3).

PRIOR ART DOCUMENT

Non-Patent Document

Non-patent document 1: "Carrier aggregation in LTE-Advanced", 3GPP TSG RAN WG1 Meeting #53bis, R1-082468, Jun. 30-Jul. 4, 2008.

Non-patent document 2: "3GPP TR36.814 v9.0.0 (2010-03)", Mar. 30, 2010.

Non-patent document 3: "Mapping Table for Rel.10 Channel Selection for CA", 3GPP TSG RAN WG1 Meeting #62, R1-104926, Aug. 23-27, 2010.

DISCLOSURE OF THE INVENTION

Problems to be Solved by the Invention

However, in the conventional technology, when the base station apparatus applies the MIMO SM to transmit a plurality of downlink transport blocks, it has been not clear how the base station apparatus allocates uplink resources used for the mobile station apparatus to transmit the information indicating ACK/NACK for the plurality of downlink transport blocks.

The present invention is made in view of the foregoing conditions; an object of the present invention is to provide a mobile communication system, a mobile station apparatus, a base station apparatus, a communication method and an integrated circuit in which, when the base station apparatus transmits a plurality of downlink transport blocks, the mobile station apparatus can efficiently determine an uplink resource used for transmitting information indicating an ACK/NACK for the plurality of downlink transport blocks.

Means for Solving the Problems (1) To achieve the above object, the present invention takes the following measures. That is, a mobile communication system of the present invention is the one in which a base station apparatus and a mobile station apparatus communicate with each other in a plurality of serving cells including a primary cell and a secondary cell, wherein the base station apparatus sets a downlink transmission mode for each of the serving cells, wherein the mobile station apparatus determines, when a downlink transmission mode in which it is possible to transmit up to two downlink transport blocks using one physical downlink shared channel is set for a certain serving cell, and one physical downlink control channel instructing the transmission of the one physical downlink shared channel in the certain serving cell is detected in the primary cell, two physical uplink control channel resources for the transmission of the one physical downlink shared channel, and wherein each of the two physical uplink control channel resources is determined using a number of a first control channel element used for the transmission of the one physical downlink control channel.

(2) Furthermore, in the mobile communication system of the present invention, one of the two physical uplink control channel resources corresponds to the number of the first control channel element used for the transmission of the one physical downlink control channel, and the other of the two physical uplink control channel resources corresponds to a number obtained by adding one to the number of the first control channel element.

(3) In addition, in the mobile communication system of the present invention, the mobile station apparatus uses one physical uplink control channel resource selected from a plurality of physical uplink control channel resources including the two physical uplink control channel resources so as to transmit, to the base station apparatus, information on an ACK/NACK for the downlink transport block.

(4) Moreover, a mobile communication system of the present invention is the one in which a base station apparatus and a mobile station apparatus communicate with each other in a plurality of serving cells including a primary cell and a secondary cell, wherein the base station apparatus sets a downlink transmission mode for each of the serving cells, wherein the mobile station apparatus determines, when a downlink transmission mode in which it is possible to transmit up to two downlink transport blocks using one physical downlink shared channel is set for a certain serving cell, and one physical downlink control channel instructing the transmission of the one physical downlink shared channel in the certain serving cell is detected in the secondary cell, two physical uplink control channel resources for the transmission of the one physical downlink shared channel, and wherein each of the two physical uplink control channel resources is determined according to one value set in a field of downlink control information transmitted in the one physical downlink control channel.

(5) Furthermore, in the mobile communication system of the present invention, one of the two physical uplink control channel resources is determined from a first set in which a plurality of physical uplink control channel resources is set, and the other of the two physical uplink control channel resources is determined from a second set in which a plurality of physical uplink control channel resources is set.

(6) Moreover, in the mobile communication system of the present invention, each of the plurality of physical uplink control channel resources set in the first set and each of the plurality of physical uplink control channel resources set in the second set are set using a signal of a higher layer transmitted by the base station apparatus.

(7) Furthermore, in the mobile communication system of the present invention, the number of the physical uplink control channel resources set in the first set is four, and the number of the physical uplink control channel resources set in the second set is four.

(8) In addition, in the mobile communication system of the present invention, a field of the downlink control information is a field of a transmission power control command for a physical uplink control channel.

(9) Moreover, in the mobile communication system of the present invention, the mobile station apparatus uses one physical uplink control channel resource selected from a plurality of physical uplink control channel resources including the two physical uplink control channel resources so as to transmit, to the base station apparatus, information on an ACK/NACK for the downlink transport block.

(10) A mobile station apparatus of the present invention is the one that communicates with a base station apparatus in a plurality of serving cells including a primary cell and a secondary cell, the mobile station apparatus including: a unit that determines, when a downlink transmission mode in which it is possible to transmit up to two downlink transport blocks using one physical downlink shared channel is set for a certain serving cell, and one physical downlink control channel instructing the transmission of the one physical downlink shared channel in the certain serving cell is detected in the primary cell, two physical uplink control channel resources for the transmission of the one physical downlink shared channel, wherein each of the two physical uplink control channel resources is determined using a number of a first control channel element used for the transmission of the one physical downlink control channel.

(11) In the mobile station apparatus of the present invention, one of the two physical uplink control channel resources corresponds to the number of the first control channel element used for the transmission of the one physical downlink control channel, and the other of the two physical uplink control channel resources corresponds to a number obtained by adding one to the number of the first control channel element.

(12) Furthermore, the mobile station apparatus of the present invention includes a unit that uses one physical uplink control channel resource selected from a plurality of physical uplink control channel resources including the two physical uplink control channel resources so as to transmit, to the base station apparatus, information on an ACK/NACK for the downlink transport block.

(13) Moreover, a mobile station apparatus of the present invention is the one that communicates with a base station apparatus in a plurality of serving cells including a primary cell and a secondary cell, the mobile station apparatus including: a unit that determines, when a downlink transmission mode in which it is possible to transmit up to two downlink transport blocks using one physical downlink shared channel is set for a certain serving cell and one physical downlink control channel instructing the transmission of the one physical downlink shared channel in the certain serving cell is detected in the secondary cell, two physical uplink control channel resources for the transmission of the one physical downlink shared channel, wherein each of the two physical uplink control channel resources is determined according to one value set in a field of downlink control information transmitted in the one physical downlink control channel.

(14) In addition, in the mobile station apparatus of the present invention, one of the two physical uplink control channel resources is determined from a first set in which a plurality of physical uplink control channel resources is set, and the other of the two physical uplink control channel resources is determined from a second set in which a plurality of physical uplink control channel resources is set.

(15) Moreover, in the mobile station apparatus of the present invention, each of the plurality of physical uplink control channel resources set in the first set and each of the plurality of physical uplink control channel resources set in the second set are set using a signal of a higher layer transmitted by the base station apparatus.

(16) Furthermore, in the mobile station apparatus of the present invention, the number of the physical uplink control channel resources set in the first set is four, and the number of the physical uplink control channel resources set in the second set is four.

(17) In addition, in the mobile station apparatus of the present invention, a field of the downlink control information command is a field of a transmission power control for a physical uplink control channel.

(18) Moreover, the mobile station apparatus of the present invention includes a unit that uses one physical uplink control channel resource selected from a plurality of physical uplink control channel resources including the two physical uplink control channel resources so as to transmit, to the base station apparatus, information on an ACK/NACK for the downlink transport block.

(19) A base station apparatus of the present invention is the one that communicates with a mobile station apparatus in a plurality of serving cells including a primary cell and a secondary cell, the base station apparatus including: a unit that sets a downlink transmission mode for each of the serving cells; and a unit that receives, when a downlink transmission mode in which it is possible to transmit up to two downlink transport blocks using one physical downlink shared channel is set for a certain serving cell and one physical downlink control channel instructing the transmission of the one physical downlink shared channel in the certain serving cell is transmitted in the primary cell, information on an ACK/NACK for the downlink transport block from the mobile station apparatus, for the transmission of the one physical downlink shared channel, from a plurality of physical uplink control channel resources including two physical uplink control channel resources determined by the mobile station apparatus, using one physical uplink control channel resource selected by the mobile station apparatus, wherein each of the two physical uplink control channel resources is determined using a number of a first control channel element used for the transmission of the one physical downlink control channel.

(20) Furthermore, in the base station apparatus of the present invention, one of the two physical uplink control channel resources corresponds to the number of the first control channel element used for the transmission of the one physical downlink control channel, and the other of the two physical uplink control channel resources corresponds to a number obtained by adding one to the number of the first control channel element.

(21) In addition, a base station apparatus of the present invention is the one that communicates with a mobile station apparatus in a plurality of serving cells including a primary cell and a secondary cell, the base station apparatus including: a unit that sets a downlink transmission mode for each of the serving cells; and a unit that receives, when a downlink transmission mode in which it is possible to transmit up to two downlink transport blocks using one physical downlink shared channel is set for a certain serving cell and one physical downlink control channel instructing the transmission of the one physical downlink shared channel in the certain serving cell is transmitted in the secondary cell, information on an ACK/NACK for the downlink transport block from the mobile station apparatus, for the transmission of the one physical downlink shared channel, from a plurality of physical uplink control channel resources including two physical uplink control channel resources determined by the mobile station apparatus, using one physical uplink control channel resource selected by the mobile station apparatus, wherein each of the two physical uplink control channel resources is determined according to one value set in a field of downlink control information transmitted in the one physical downlink control channel.

(22) Moreover, in the base station apparatus of the present invention, one of the two physical uplink control channel resources is determined from a first set in which a plurality of physical uplink control channel resources is set, and the other of the two physical uplink control channel resources is determined from a second set in which a plurality of physical uplink control channel resources is set.

(23) Furthermore, the base station apparatus of the present invention includes a unit that uses a signal of a higher layer to set each of the plurality of physical uplink control channel resources set in the first set and each of the plurality of physical uplink control channel resources set in the second set.

(24) In addition, in the base station apparatus of the present invention, the number of the physical uplink control channel resources set in the first set is four, and the number of the physical uplink control channel resources set in the second set is four.

(25) Moreover, in the base station apparatus of the present invention, a field of the downlink control information is a field of a transmission power control command for a physical uplink control channel.

(26) Furthermore, a communication method of the present invention is the communication method of a mobile station apparatus that communicates with a base station apparatus in a plurality of serving cells including a primary cell and a secondary cell, the communication method including the step of determining, when a downlink transmission mode in which it is possible to transmit up to two downlink transport blocks using one physical downlink shared channel is set for a certain serving cell and one physical downlink control channel instructing the transmission of the one physical downlink shared channel in the certain serving cell is detected in the primary cell, two physical uplink control channel resources for the transmission of the one physical downlink shared channel, wherein each of the two physical uplink control channel resources is determined using a number of a first control channel element used for the transmission of the one physical downlink control channel.

(27) In addition, in the communication method of the present invention, one of the two physical uplink control channel resources corresponds to the number of the first control channel element used for the transmission of the one physical downlink control channel, and the other of the two physical uplink control channel resources corresponds to a number obtained by adding one to the number of the first control channel element.

(28) Moreover, in the communication method of the present invention, the method uses one physical uplink control channel resource selected from a plurality of physical uplink control channel resources including the two physical uplink control channel resources so as to transmit, to the base station apparatus, information on an ACK/NACK for the downlink transport block.

(29) Furthermore, a communication method of the present invention is the communication method of a mobile station apparatus that communicates with a base station apparatus in a plurality of serving cells including a primary cell and a secondary cell, the communication method including the step of determining, when a downlink transmission mode in which it is possible to transmit up to two downlink transport blocks using one physical downlink shared channel is set for a certain serving cell and one physical downlink control channel instructing the transmission of the one physical downlink shared channel in the certain serving cell is detected in the secondary cell, two physical uplink control channel resources for the transmission of the one physical downlink shared channel, wherein each of the two physical uplink control channel resources is determined according to one value set in a field of downlink control information transmitted in the one physical downlink control channel.

(30) In addition, in the communication method of the present invention, one of the two physical uplink control channel resources is determined from a first set in which a plurality of physical uplink control channel resources is set, and the other of the two physical uplink control channel resources is determined from a second set in which a plurality of physical uplink control channel resources is set.

(31) Moreover, in the communication method of the present invention, each of the plurality of physical uplink control channel resources set in the first set and each of the plurality of physical uplink control channel resources set in the second set are set using a signal of a higher layer transmitted by the base station apparatus.

(32) Furthermore, in the communication method of the present invention, the number of the physical uplink control channel resources set in the first set is four, and the number of the physical uplink control channel resources set in the second set is four.

(33) In addition, in the communication method of the present invention, a field of the downlink control information is a field of a transmission power control command for a physical uplink control channel.

(34) Furthermore, in the communication method of the present invention, the method uses one physical uplink control channel resource selected from a plurality of physical uplink control channel resources including the two physical uplink control channel resources so as to transmit, to the base station apparatus, information on an ACK/NACK for the downlink transport block.

(35) Moreover, a communication method of the present invention is the communication method of a base station apparatus that communicates with a mobile station apparatus in a plurality of serving cells including a primary cell and a secondary cell, the communication method including the steps of: setting a downlink transmission mode for each of the serving cells; and receiving, when a downlink transmission mode in which it is possible to transmit up to two downlink transport blocks using one physical downlink shared channel is set for a certain serving cell and one physical downlink control channel instructing the transmission of the one physical downlink shared channel in the certain serving cell is transmitted in the primary cell, information indicating an ACK/NACK for the downlink transport block from the mobile station apparatus, for the transmission of the one physical downlink shared channel, from a plurality of physical uplink control channel resources including two physical uplink control channel resources determined by the mobile station apparatus, using one physical uplink control channel resource selected by the mobile station apparatus, wherein each of the two physical uplink control channel resources is determined using a number of a first control channel element used for the transmission of the one physical downlink control channel.

(36) In addition, in the communication method of the present invention, one of the two physical uplink control channel resources corresponds to the number of the first control channel element used for the transmission of the one physical downlink control channel, and the other of the two physical uplink control channel resources corresponds to a number obtained by adding one to the number of the first control channel element.

(37) Moreover, a communication method of the present invention is the communication method of a base station apparatus that communicates with a mobile station apparatus in a plurality of serving cells including a primary cell and a secondary cell, the communication method including the steps of: setting a downlink transmission mode for each of the serving cells; and receiving, when a downlink transmission mode in which it is possible to transmit up to two downlink transport blocks using one physical downlink shared channel is set for a certain serving cell and one physical downlink control channel instructing the transmission of the one physical downlink shared channel in the certain serving cell is transmitted in the secondary cell, information on an ACK/NACK for the downlink transport block from the mobile station apparatus, for the transmission of the one physical downlink shared channel, from a plurality of physical uplink control channel resources including two physical uplink control channel resources determined by the mobile station apparatus, using one physical uplink control channel resource selected by the mobile station apparatus, wherein each of the two physical uplink control channel resources is determined according to one value set in a field of downlink control information transmitted in the one physical downlink control channel.

(38) Furthermore, in the communication method of the present invention, one of the two physical uplink control channel resources is determined from a first set in which a plurality of physical uplink control channel resources is set, and the other of the two physical uplink control channel resources is determined from a second set in which a plurality of physical uplink control channel resources is set.

(39) In addition, in the communication method of the present invention, each of the plurality of physical uplink control channel resources set in the first set and each of the plurality of physical uplink control channel resources set in the second set are set using a signal of a higher layer.

(40) Moreover, in the communication method of the present invention, the number of the physical uplink control channel resources set in the first set is four, and the number of the physical uplink control channel resources set in the second set is four.

(41) Furthermore, in the communication method of the present invention, a field of the downlink control information is a field of a transmission power control command for a physical uplink control channel.

(42) In addition, an integrated circuit of the present invention is the one mounted on a mobile station apparatus that communicates with a base station apparatus in a plurality of serving cells including a primary cell and a secondary cell, the integrated circuit causing the mobile station apparatus to exert a function of, determining, when a downlink transmission mode in which it is possible to transmit up to two downlink transport blocks using one physical downlink shared channel is set for a certain serving cell and one physical downlink control channel instructing the transmission of the one physical downlink shared channel in the certain serving cell is detected in the primary cell, two physical uplink control channel resources for the transmission of the one physical downlink shared channel, wherein each of the two physical uplink control channel resources is determined using a number of a first control channel element used for the transmission of the one physical downlink control channel.

(43) Moreover, an integrated circuit of the present invention is the one mounted on a mobile station apparatus that communicates with a base station apparatus in a plurality of serving cells including a primary cell and a secondary cell, the integrated circuit causing the mobile station apparatus to exert a function of, determining, when a downlink transmission mode in which it is possible to transmit up to two downlink transport blocks using one physical downlink shared channel is set for a certain serving cell and one physical downlink control channel instructing the transmission of the one physical downlink shared channel in the certain serving cell is detected in the secondary cell, two physical uplink control channel resources for the transmission of the one physical downlink shared channel, wherein each of the two physical uplink control channel resources is determined according to one value set in a field of downlink control information transmitted in the one physical downlink control channel.

(44) Furthermore, an integrated circuit of the present invention is the one mounted on a mobile station apparatus that communicates with a base station apparatus in a plurality of serving cells including a primary cell and a secondary cell, the integrated circuit causing the mobile station apparatus to exert a function of, setting a downlink transmission mode for each of the serving cells, and receiving, when a downlink transmission mode in which it is possible to transmit up to two downlink transport blocks using one physical downlink shared channel is set for a certain serving cell and one physical downlink control channel instructing the transmission of the one physical downlink shared channel in the certain serving cell is transmitted in the primary cell, information indicating an ACK/NACK for the downlink transport block from the mobile station apparatus, for the transmission of the one physical downlink shared channel, from a plurality of physical uplink control channel resources including two physical uplink control channel resources determined by the mobile station apparatus, using one physical uplink control channel resource selected by the mobile station apparatus, wherein each of the two physical uplink control channel resources is determined using a number of a first control channel element used for the transmission of the one physical downlink control channel.

(45) In addition, an integrated circuit of the present invention is the one mounted on a mobile station apparatus that communicates with a base station apparatus in a plurality of serving cells including a primary cell and a secondary cell, the integrated circuit causing the mobile station apparatus to exert a function of, setting a downlink transmission mode for each of the serving cells, and receiving, when a downlink transmission mode in which it is possible to transmit up to two downlink transport blocks using one physical downlink shared channel is set for a certain serving cell and one physical downlink control channel instructing the transmission of the one physical downlink shared channel in the certain serving cell is transmitted in the secondary cell, information on an ACK/NACK for the downlink transport block from the mobile station apparatus, for the transmission of the one physical downlink shared channel, from a plurality of physical uplink control channel resources including two physical uplink control channel resources determined by the mobile station apparatus, using one physical uplink control channel resource selected by the mobile station apparatus, wherein each of the two physical uplink control channel resources is determined according to one value set in a field of downlink control information transmitted in the one physical downlink control channel.

Effect of the Invention

When a base station apparatus transmits a plurality of downlink transport blocks, a mobile station apparatus can efficiently determine an uplink resource used for transmitting information indicating an ACK/NACK for the plurality of downlink transport blocks.

BRIEF DESCRIPTION OF THE DRAWINGS

FIG. 5 is a diagram illustrating the transmission of information indicating an ACK/NACK by channel selection;

BEST MODES FOR CARRYING OUT THE INVENTION

Figure 1:
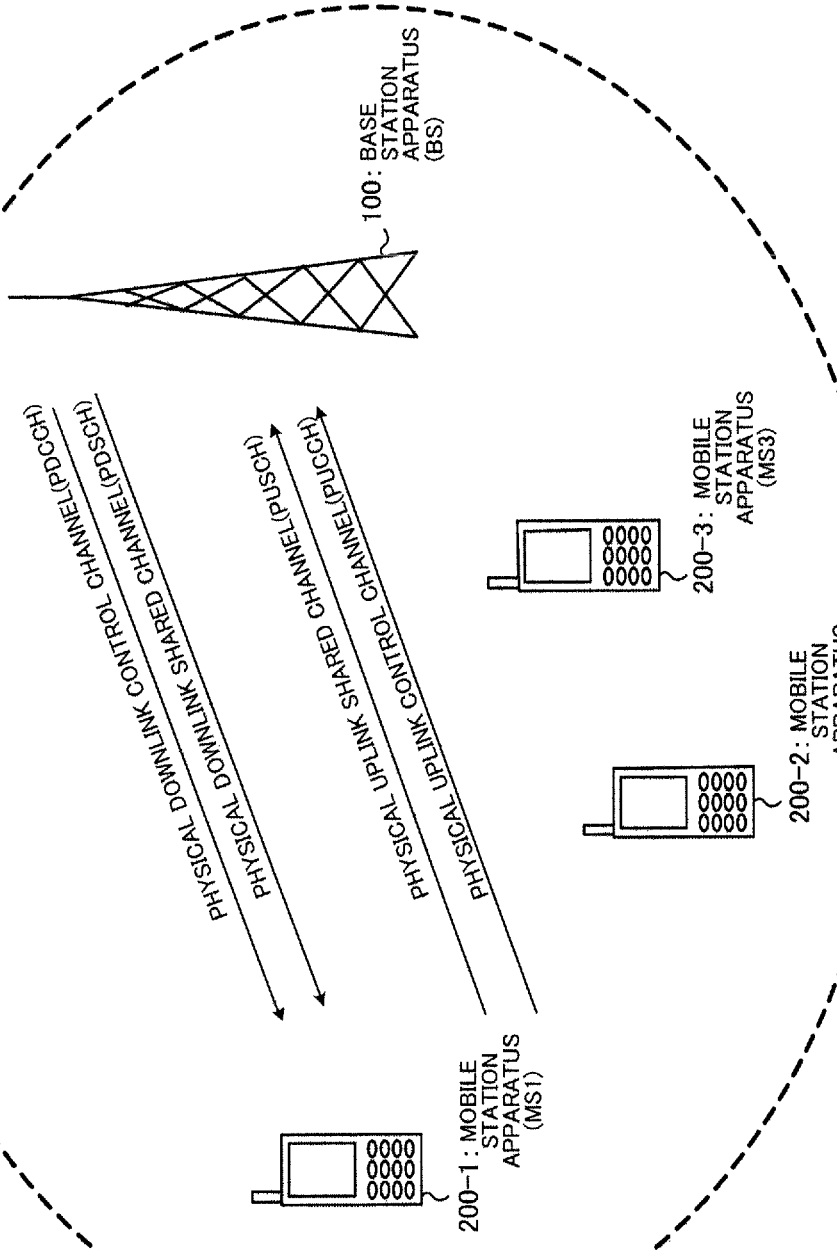
FIG. 1 is a diagram conceptually showing the configuration of physical channels according to an embodiment of the present invention.

Next, an embodiment according to the present invention will now be described with reference to the accompanying drawings. FIG. 1 is a diagram showing an example of the configuration of channels in the embodiment of the present invention. Downlink physical channels include a Physical Downlink Control Channel (PDCCH), a Physical Downlink Shared Channel (PDSCH) and the like. Uplink physical channels include a Physical Uplink Shared Channel (PUSCH), a Physical Uplink Control Channel (PUCCH) and the like.

The PDCCH is a channel that is used to notify (specify) mobile station apparatuses 200-1 to 200-3 (hereinafter, the mobile station apparatuses 200-1 to 200-3 are also collectively represented by the mobile station apparatus 200) of the resource allocation of the PDSCH, HARQ processing information for downlink data, the resource allocation of the PUSCH and the like. The PDCCH is constituted by a plurality of Control Channel Elements (CCEs), and the mobile station apparatus 200 detects the PDCCH constituted by the CCEs to thereby receive the PDCCH from the base station apparatus 100. This CCE is constituted by a plurality of Resource Element Groups (REGs; also referred to mini-CCEs) dispersed in a frequency and a time domain. Here, the resource element is a unit resource constituted by one OFDM symbol (time component) and one subcarrier (frequency component).

Moreover, the PDCCH is coded separately for each of the mobile station apparatuses 200 and for each of types (Separate Coding). Specifically, the mobile station apparatus 200 detects a plurality of PDCCHs to acquire the resource allocation in the downlink, the resource allocation in the uplink and other control information. A CRC (cyclic redundancy check) is given to each of the PDCCHs; the mobile station apparatus 200 performs the CRC for each of the sets of CCEs that may constitute the PDCCH, and the PDCCH on which the CRC has been successfully performed is acquired as the PDCCH addressed to its own apparatus. This is also referred to as blind decoding; the range of the sets of CCEs that can constitute the PDCCH on which the blind decoding is performed is referred to as a search space. That is, the mobile station apparatus 200 performs the blind decoding on the CCEs within the Search Space to detect the PDCCH addressed to its own apparatus.

The mobile station apparatus 200, when the resource allocation of the PDSCH is included in the PDCCH addressed to its own apparatus, receives, according to the resource allocation indicated by the PDCCH from the base station apparatus 100, using the PDSCH, a downlink signal (downlink data (transport block for downlink shared channel (DL-SCH)) and/or downlink control data (downlink control information). In other words, the PDCCH can also be said to be a signal (also referred to as a Downlink grant or a Downlink assignment) for performing the resource allocation for the downlink.

Moreover, the mobile station apparatus 200, when the resource allocation of the PDSCH is included in the PDCCH addressed to its own apparatus, transmits, according to the resource allocation indicated by the PDCCH from the base station apparatus 100, using the PUSCH, an uplink signal (uplink data (transport block for uplink shared channel (UL-SCH)) and/or uplink control data (uplink control information). In other words, the PDCCH can also be said to be a signal (also referred to as an Uplink grant or an Uplink assignment) for allowing the data transmission for the uplink.

The PDCCH is used for transmitting the Downlink Control Information (DCI) such as the downlink assignment and the uplink assignment. The downlink assignment is constituted by (includes), for example, information for the allocation of the resources of the PDSCH transmitted by the base station apparatus 100 to the mobile station apparatus 200. The uplink assignment is constituted by (includes) information for the allocation of the resources of the PUSCH transmitted by the mobile station apparatus 200 to the base station apparatus 100. One downlink assignment includes information for the allocation of the resources of one PDSCH in a certain cell; one uplink assignment includes information for the allocation of the resources of one PUSCH in a certain cell.

Here, for the downlink control information, a plurality of downlink control information formats (DCI formats) is prepared. Different DCI formats are used for different purposes. The DCI format is defined by the size and the order of a plurality of fields mapped onto the DCI format, the types of information mapped onto the fields and the like.

For example, as the DCI format used as the downlink assignment, a DCI format 1/1A that is used when the PDSCH is transmitted by the base station apparatus 100 with a single antenna port (for example, one PDSCH code word (one transport block) is transmitted) is defined. Moreover, for example, as the DCI format used as the downlink assignment, a DCI format 2 that is used when the PDSCH is transmitted by the base station apparatus 100 with multi-antenna port (for example, up to two PDSCH code words (up to two transport blocks) are transmitted), or the like is defined.

For example, the DCI format 1/1A used as the downlink assignment includes the information indicating the resource allocation of the PDSCH, information indicating a modulation coding scheme (MCS information), a New data indicator and a TPC command for the PUCCH (TPC (Transmission Power Control) command for the PUCCH).

Moreover, for example, the DCI format 2 used as the downlink assignment includes the information indicating the resource allocation of the PDSCH, information (MCS information 1) indicating a modulation coding scheme for the first code word (first transport block), information (MCS information 2) indicating a modulation coding scheme for the second code word (second transport block), a new data indicator (New data indicator 1) for the first code word (first transport block), a new data indicator (New data indicator 2) for the second code word (second transport block), and the TPC command for the PUCCH (TPC command for PUCCH).

In addition, the PDSCH is a channel that is used for transmitting the downlink data (transport block for the downlink shared channel (DL-SCH)) or paging information (paging channel: PCH). The base station apparatus 100 uses the PDSCH allocated by the PDCCH to transmit the downlink transport block (transport block for the downlink shared channel (DL-SCH)) to the mobile station apparatus 200.

Here, the downlink data indicates, for example, user data; the DL-SCH is a transport channel. Moreover, a unit for transmitting the downlink data (DL-SCH) in the PDSCH is referred to as a Transport Block (TB); the transport block is a unit dealt with in a MAC (Media Access Control) layer. In the DL-SCH, the HARQ and dynamic adaptive radio link control are supported, and beam forming is available. In the DL-SCH, dynamic resource allocation and quasi-static resource allocation are supported.

Here, the transport block is associated with the Code Word (CW) in the physical layer. For example, the base station apparatus 100 applies the MIMO SM to the PDSCH, and can perform transmission with two code words.

The PUSCH is a channel that is used for mainly transmitting the uplink data (transport block for the uplink shared channel (UL-SCH)). The mobile station apparatus 200 uses the PUSCH allocated by the PDCCH transmitted from the base station apparatus 100 to transmit the uplink transport block (transport block for the uplink shared channel (UL-SCH)) to the base station apparatus 100.

Furthermore, when the base station apparatus 100 performs scheduling on the mobile station apparatus 200, the uplink control information is also transmitted using the PUSCH. Here, the uplink control information includes Channel State Information (CSI), Channel Quality Indicator (CQI), Precoding Matrix Indicator (PMI) and Rank Indicator (RI). The information indicating the ACK/NACK in the HARQ for the downlink transport block (which may be DL-SCH) is included in the uplink control information. Scheduling Request (SR) for requesting resource allocation (requesting transmission in the UL-SCH) for the transmission of the uplink data by the mobile station apparatus 200 is included in the uplink control information.

Here, the uplink data indicates, for example, user data; the UL-SCH is a transport channel. In addition, a unit for transmitting the uplink data (UL-SCH) in the PUSCH is referred to as a Transport Block (TB); the transport block is a unit dealt with in the MAC (Medium Access Control) layer. Moreover, the PUSCH is a physical channel that is defined (formed) by the time domain and the frequency domain. In the UL-SCH, the HARQ and the dynamic adaptive radio link control are supported, and the beam forming is available. In the UL-SCH, dynamic resource allocation and quasi-static resource allocation are supported.

Furthermore, a radio resource control signal (hereinafter referred to as "RRC signaling: Radio Resource Control Signaling") exchanged between the base station apparatus 100 and the mobile station apparatus 200 may be included in the uplink data (UL-SCH) and the downlink data (DL-SCH). Moreover, a MAC (Medium Access Control) control element exchanged between the base station apparatus 100 and the mobile station apparatus 200 may be included in the uplink data (UL-SCH) and the downlink data (DL-SCH).

The base station apparatus 100 and the mobile station apparatus 200 transmit and receive the RRC signaling in a higher layer (Radio Resource Control Layer). In addition, the base station apparatus 100 and the mobile station apparatus 200 also transmit and receive the MAC control element in a higher layer (Medium Access Control (MAC) layer).

The PUCCH is a channel that is used for transmitting the uplink control information. Here, the uplink control information includes the channel state information (CSI), the channel quality indicator (CQI), the precoding matrix indicator (PMI) and the rank indicator (RI). Furthermore, the information indicating the ACK/NACK in the HARQ for the downlink transport block (DL-SCH) is included in the uplink control information. The scheduling request (SR) for requesting resource allocation (requesting transmission in the UL-SCH) for the transmission of the uplink data by the mobile station apparatus 200 is included in the uplink control information.

[Configuration of the Base Station Apparatus 100]

Figure 2:
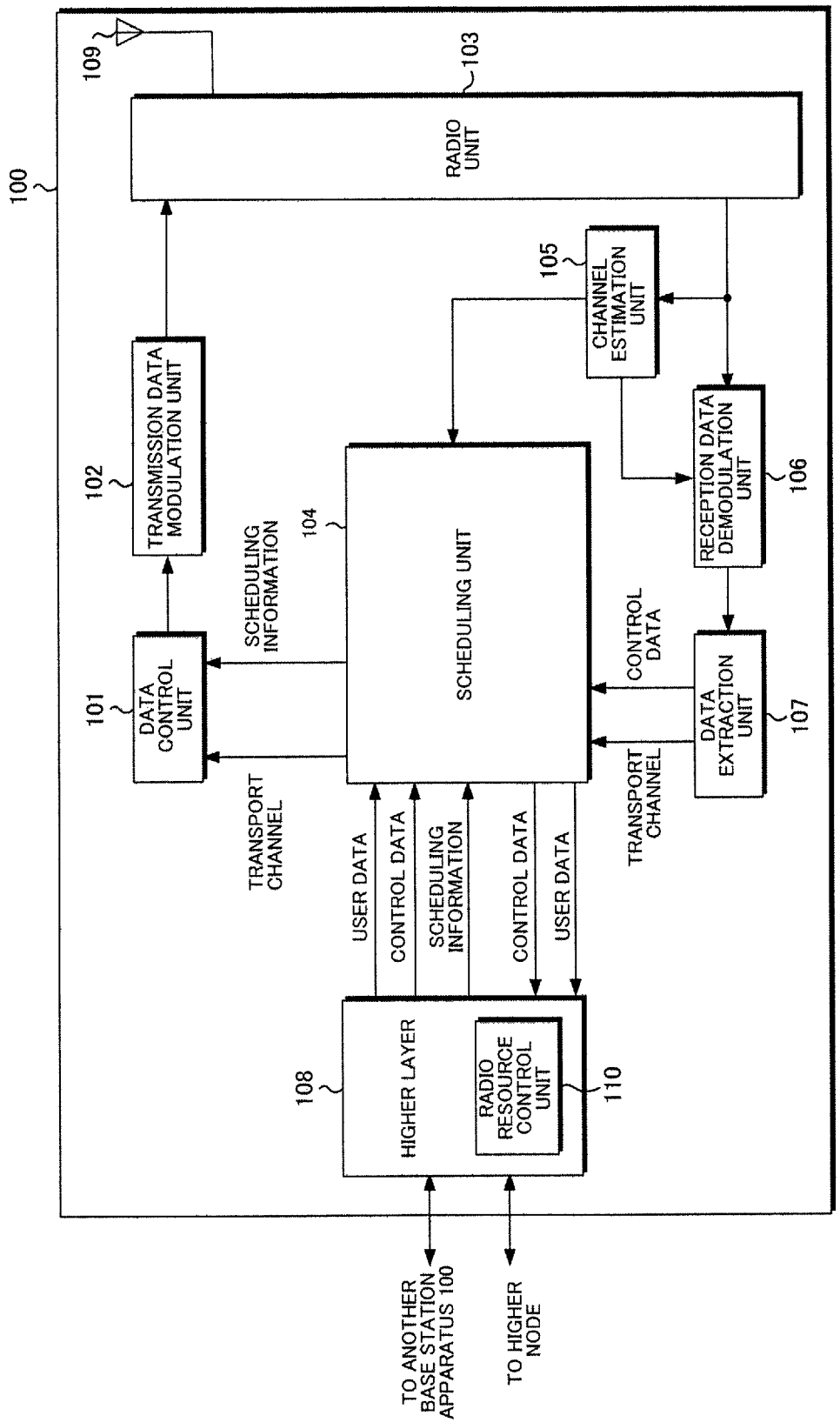
FIG. 2 is a block diagram showing the schematic configuration of a base station apparatus 100 according to the embodiment of the present invention.

FIG. 2 is a block diagram showing the schematic configuration of the base station apparatus 100 according to the embodiment of the present invention. The base station apparatus 100 includes a data control unit 101, a transmission data modulation unit 102, a radio unit 103, a scheduling unit 104, a channel estimation unit 105, a reception data demodulation unit 106, a data extraction unit 107, a higher layer 108 and an antenna 109.

In addition, the radio unit 103, the scheduling unit 104, the channel estimation unit 105, the reception data demodulation unit 106, the data extraction unit 107, the higher layer 108 and the antenna 109 constitute a reception unit; the data control unit 101, the transmission data modulation unit 102, the radio unit 103, the scheduling unit 104, the higher layer 108 and the antenna 109 constitute a transmission unit.

The antenna 109, the radio unit 103, the channel estimation unit 105, the reception data demodulation unit 106 and the data extraction unit 107 perform processing on the uplink physical layer. The antenna 109, the radio unit 103, the transmission data modulation unit 102 and the data control unit 101 perform processing on the downlink physical layer.

The data control unit 101 receives the transport channel from the scheduling unit 104. The data control unit 101 maps, onto the physical channel, a signal and a channel generated by the transport channel and the physical layer based on the scheduling information input from the scheduling unit 104. The individual pieces of data mapped as described above are output to the transmission data modulation unit 102.

The transmission data modulation unit 102 modulates transmission data into an OFDM system. Based on the scheduling information from the scheduling unit 104 and a modulation scheme and a coding scheme corresponding to each PRB, the transmission data modulation unit 102 performs, on the data input from the data control unit 101, signal processing such as data modulation, coding, series/parallel transform for an input signal, IFFT (Inverse Fast Fourier Transform) processing, CP (Cyclic Prefix) insertion and filtering, generates transmission data and outputs it to the radio unit 103. Here, the scheduling information includes downlink physical resource block PRB (Physical Resource Block) allocation information and physical resource block position information formed with, for example, a frequency and a time; the modulation scheme and the coding scheme corresponding to each PRB include information such as a modulation scheme: 16QAM and a coding rate: 2/3 coding rate.

The radio unit 103 upconverts modulation data input from the transmission data modulation unit 102 into a radio frequency to generate a radio signal, and transmits it through the antenna 109 to the mobile station apparatus 200. Moreover, the radio unit 103 receives, through the antenna 109, an uplink radio signal from the mobile station apparatus 200, downconverts it into a baseband signal and outputs the reception data to the channel estimation unit 105 and the reception data demodulation unit 106.

The scheduling unit 104 performs processing on the Medium Access Control (MAC) layer. The scheduling unit 104 performs mapping of a logical channel and the transport channel, scheduling (such as the HARQ processing and the selection of the transport format) on the downlink and the uplink and the like. In the scheduling unit 104, in order to integrally control the processing unit of each physical layer, there are interfaces between the scheduling unit 104 and the antenna 109, the radio unit 103, the channel estimation unit 105, the reception data demodulation unit 106, the data control unit 101, the transmission data modulation unit 102 and the data extraction unit 107 (however, not shown).

In the downlink scheduling, based on the uplink control information (such as the CSI, the CQI, the PMI and the RI, the information indicating the ACK/NACK for the downlink transport block and the scheduling request) received from the mobile station apparatus 200, information on the PRB available for each mobile station apparatus 200, buffer status, the scheduling information input from the higher layer 108 and the like, the scheduling unit 104 performs processing for selecting the downlink transport format (transmission form, that is, the allocation of the physical resource blocks, the modulation scheme, the coding scheme and the like) for modulating each piece of data, retransmission control on the HARQ and the generation of the scheduling information used in the downlink. The scheduling information used for the scheduling of the downlink is output to the data control unit 101.

Furthermore, in the uplink scheduling, based on the result of the estimation of the channel state (radio channel state) of the uplink output by the channel estimation unit 105, a resource allocation request from the mobile station apparatus 200, information on the PRB available for each mobile station apparatus 200, the scheduling information input from the higher layer 108 and the like, the scheduling unit 104 performs processing for selecting the uplink transport format (transmission form, that is, the allocation of the physical resource blocks, the modulation scheme, the coding scheme and the like) for modulating each piece of data and the generation of the scheduling information used in the uplink scheduling. The scheduling information used for the scheduling of the uplink is output to the data control unit 101.

In addition, the scheduling unit 104 also maps the downlink logical channel input from the higher layer 108 onto the transport channel, and outputs it to the data control unit 101. Moreover, the scheduling unit 104 also processes, as necessary, the control data and the transport channel acquired in the uplink input from the data extraction unit 107, thereafter maps them onto the uplink logical channel and outputs them to the higher layer 108.

In order to demodulate the uplink data, the channel estimation unit 105 estimates the channel state of the uplink from an Uplink Demodulation Reference Signal (UDRS), and outputs the result of the estimation to the reception data demodulation unit 106. In order to perform scheduling for the uplink, the channel estimation unit 105 also estimates the channel state of the uplink from an uplink measurement reference signal (Sounding Reference Signal (SRS)), and outputs the estimation result to the scheduling unit 104.

The reception data demodulation unit 106 also serves as an OFDM demodulation unit and/or a DFT-Spread-OFDM (DFT-S-OFDM) demodulation unit that demodulates the reception data modulated into the OFDM system and/or the SC-FDMA system. Based on the result of the estimation of the channel state of the uplink input from the channel estimation unit 105, the reception data demodulation unit 106 performs, on the modulation data input from the radio unit 103, signal processing such as DFT transform, subcarrier mapping, IFFT transform and filtering, performs demodulation processing on it and outputs it to the data extraction unit 107.

The data extraction unit 107 checks whether or not the data input from the reception data demodulation unit 106 is correct, and outputs the result of the checking (ACK or NACK) to the scheduling unit 104. Furthermore, the data extraction unit 107 separates the data input from the reception data demodulation unit 106 into the transport channel and the control data on the physical layer, and outputs them to the scheduling unit 104. The separated control data includes the CSI, the CQI, the PMI and the RI transmitted from the mobile station apparatus 200, the information indicting the ACK/NACK for the downlink transport block, the scheduling request and the like.

The higher layer 108 performs processing on a Packet Data Convergence Protocol (PDCP) layer, a Radio Link Control (RLC) layer and a Radio Resource Control (RRC) layer. In the higher layer 108, in order to integrally control the processing unit of a lower layer, there are interfaces between the higher layer 108 and the scheduling unit 104, the antenna 109, the radio unit 103, the channel estimation unit 105, the reception data demodulation unit 106, the data control unit 101, the transmission data modulation unit 102 and the data extraction unit 107 (however, not shown).

The higher layer 108 has the radio resource control unit 110 (also called the control unit). In addition, the radio resource control unit 110 performs management on various types of setting information, management on system information, paging control, management on the communication state of each mobile station apparatus 200, mobility management such as handover or the like, management on the buffer status of each mobile station apparatus 200, management on the connection setting of a unicast and a multicast bearer, management on a mobile station identifier (UEID) and the like. The higher layer 108 exchanges information with another base station apparatus 100 and information with the higher node.

[Configuration of the Mobile Station Apparatus 200]

Figure 3:
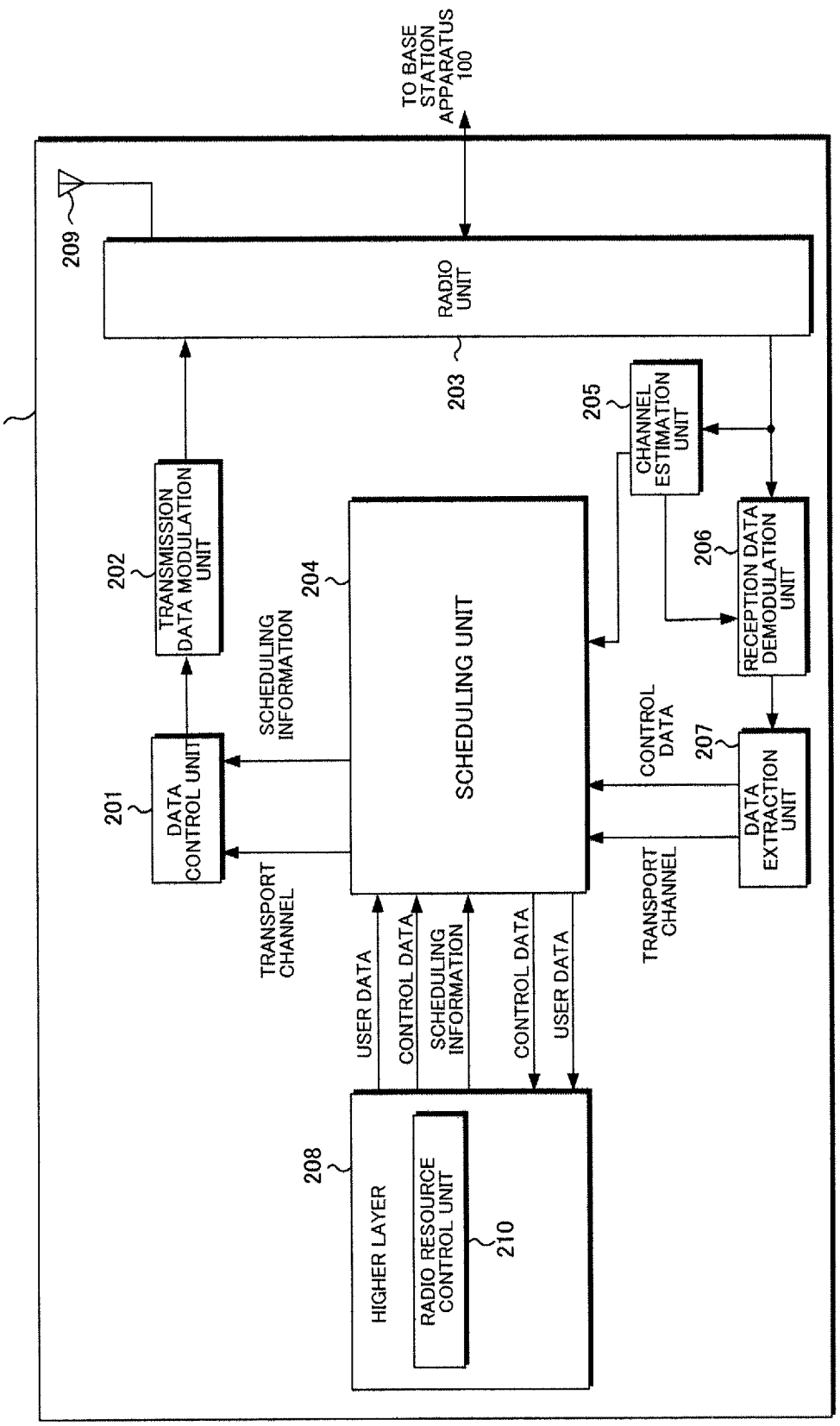
FIG. 3 is a block diagram showing the schematic configuration of a mobile station apparatus 200 according to the embodiment of the present invention.

FIG. 3 is a block diagram showing the schematic configuration of the mobile station apparatus 200 according to the embodiment of the present invention. The mobile station apparatus 200 includes a data control unit 201, a transmission data modulation unit 202, a radio unit 203, a scheduling unit 204, a channel estimation unit 205, a reception data demodulation unit 206, a data extraction unit 207, a higher layer 208 and an antenna 209. Moreover, the data control unit 201, the transmission data modulation unit 202, the radio unit 203, the scheduling unit 204, the higher layer 208 and the antenna 209 constitute the transmission unit; the radio unit 203, the scheduling unit 204, the channel estimation unit 205, the reception data demodulation unit 206, the data extraction unit 207, the higher layer 208 and the antenna 209 constitute the reception unit.

The data control unit 201, the transmission data modulation unit 202 and the radio unit 203 perform processing on the uplink physical layer. The radio unit 203, the channel estimation unit 205, the reception data demodulation unit 206 and the data extraction unit 207 perform processing on the downlink physical layer.

The data control unit 201 receives the transport channel from the scheduling unit 204. The transport channel and the signal and the channel generated in the physical layer are mapped onto the physical channel based on the scheduling information input from the scheduling unit 204. The individual pieces of data mapped as described above are output to the transmission data modulation unit 202.

The transmission data modulation unit 202 modulates transmission data into the OFDM system and/or the SC-FDMA system. The transmission data modulation unit 202 performs, on the data input from the data control unit 201, signal processing such as data modulation, DFT (discrete Fourier transform) processing, subcarrier mapping, IFFT (inverse fast Fourier transform) processing, CP insertion and filtering, generates transmission data and outputs it to the radio unit 203.

The radio unit 203 upconverts modulation data input from the transmission data modulation unit 202 into a radio frequency to generate a radio signal, and transmits it through the antenna 209 to the base station apparatus 100. Furthermore, the radio unit 203 receives, through the antenna 209, the radio signal modulated by the downlink data from the base station apparatus 100, downconverts it into a baseband signal and outputs the reception data to the channel estimation unit 205 and the reception data demodulation unit 206.

The scheduling unit 204 performs processing on the Medium Access Control (MAC) layer. The scheduling unit 204 performs mapping of the logical channel and the transport channel, scheduling (such as the HARQ processing and the selection of the transport format) on the downlink and the uplink and the like. In the scheduling unit 204, in order to integrally control the processing unit of each physical layer, there are interfaces between the scheduling unit 204 and the antenna 209, the data control unit 201, the transmission data modulation unit 202, the channel estimation unit 205, the reception data demodulation unit 206, the data extraction unit 207 and the radio unit 203 (however, not shown).

In the downlink scheduling, based on the scheduling information (the transport format and the HARQ retransmission information) from the base station apparatus 100 and the higher layer 208, the scheduling unit 204 performs reception control on the transport channel, the physical signal and the physical channel and generates the scheduling information used in the HARQ retransmission control and the downlink scheduling. The scheduling information used in the scheduling of the downlink is output to the data control unit 201.

In the uplink scheduling, based on buffer status in the uplink input from the higher layer 208, the scheduling information (such as the transport format and the HARQ retransmission control) for the uplink from the base station apparatus 100 input from the data extraction unit 207, the scheduling information input from the higher layer 208 and the like, the scheduling unit 204 performs scheduling processing for mapping the uplink logic channel input from the higher layer 208 onto the transport channel and generates the scheduling information used in the uplink scheduling. Note that, for the uplink transport format, information notified from the base station apparatus 100 is utilized. The scheduling information described above is output to the data control unit 201.

In addition, the scheduling unit 204 also maps the uplink logic channel input from the higher layer 208 onto the transport channel, and outputs it to the data control unit 201. Moreover, the scheduling unit 204 also outputs, to the data control unit 201, the CSI, the CQI, the PMI and the RI input from the channel estimation unit 205 and the result of the confirmation of the CRC check input from the data extraction unit 207. Furthermore, the scheduling unit 204 processes, as necessary, the control data input from the data extraction unit 207 and acquired in the downlink and the transport channel, thereafter maps them onto the downlink logic channel and outputs them to the higher layer 208.

In order to demodulate the downlink data, the channel estimation unit 205 estimates the channel state of the downlink from the downlink reference signal, and outputs the estimation result to the reception data demodulation unit 206. In addition, in order to notify the base station apparatus 100 of the estimation result of the downlink channel state (radio channel state, the CSI, the CQI, the PMI and the RI), the channel estimation unit 205 estimates the downlink channel state from the downlink reference signal, and outputs the estimation result to the scheduling unit 204 as, for example, the CSI, the CQI, the PMI and the RI.

The reception data demodulation unit 206 demodulates the reception data modulated into the OFDM system. The reception data demodulation unit 206 performs, based on the estimation result of the downlink channel state input from the channel estimation unit 205, the demodulation processing on the modulation data input from the radio unit 203, and outputs it to the data extraction unit 207.

The data extraction unit 207 performs the CRC check on the data input from the reception data demodulation unit 206 to check whether or not the data is correct, and outputs the checking result (ACK or NACK) to the scheduling unit 204. Moreover, the data extraction unit 207 separates the data input from the reception data demodulation unit 206 into the transport channel and the control data on the physical layer, and outputs them to the scheduling unit 204. The separated control data includes the scheduling information such as the resource allocation of the downlink and the uplink and the uplink HARQ control information.

The higher layer 208 performs processing on the Packet Data Convergence Protocol (PDCP) layer, the Radio Link Control (RLC) layer and the Radio Resource Control (RRC) layer. In the higher layer 208, in order to integrally control the processing unit of the lower layer, there are interfaces between the higher layer 208 and the scheduling unit 204, the antenna 209, the data control unit 201, the transmission data modulation unit 202, the channel estimation unit 205, the reception data demodulation unit 206, the data extraction unit 207 and the radio unit 203 (however, not shown).

The higher layer 208 has the radio resource control unit 210 (also called the control unit). The radio resource control unit 210 performs management on various types of setting information, management on system information, paging control, management on the communication state of its own station, mobility management such as handover, management on the buffer status, management on the connection setting of the unicast and the multicast bearer and management on the mobile station identifier (UEID).

[Cell Aggregation (Carrier Aggregation)]

Figure 4:
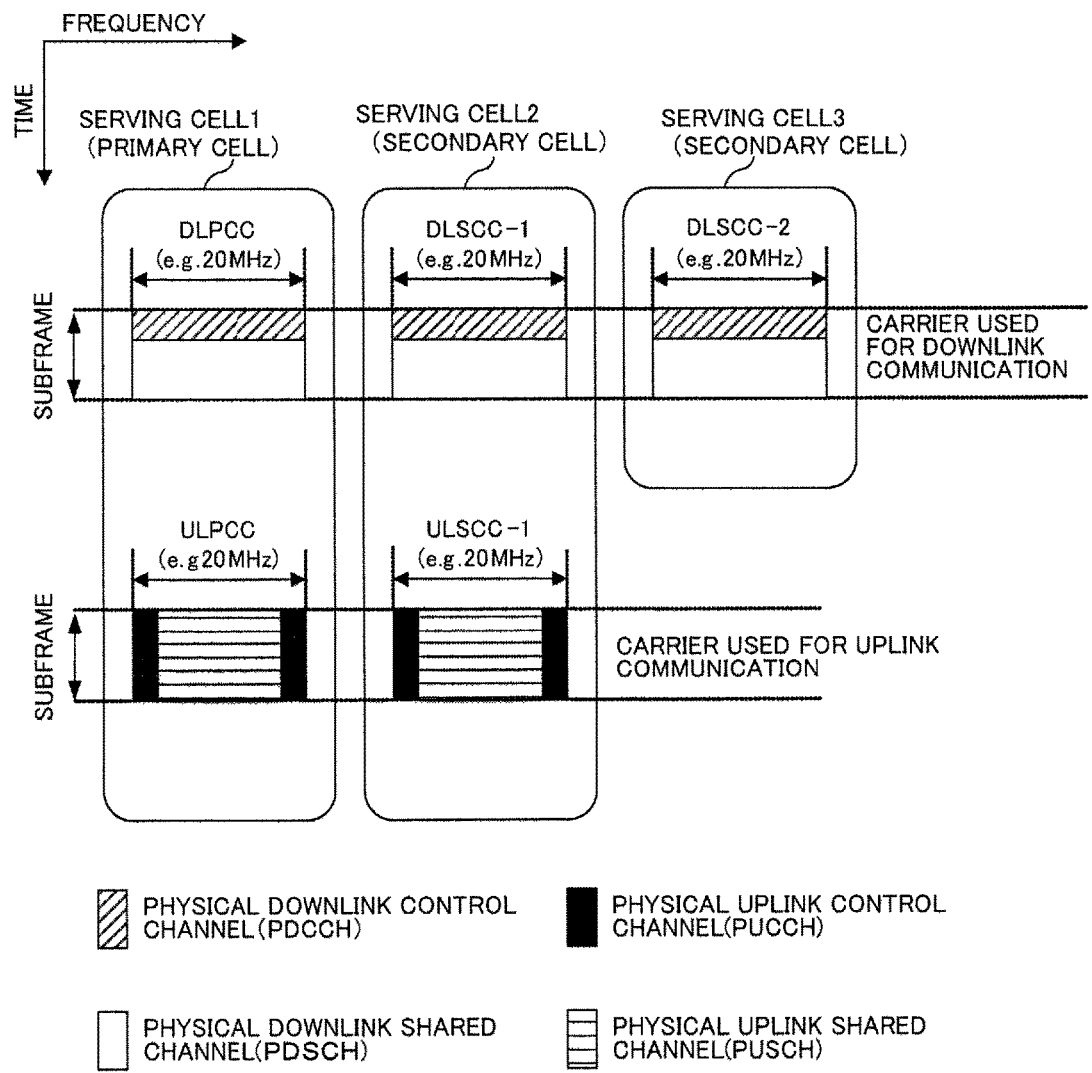
FIG. 4 is a diagram showing an example of a mobile communication system to which the embodiment of the present invention can be applied.

FIG. 4 is a diagram showing an example of the processing of the base station apparatus 100 and the mobile station apparatus 200 in the mobile communication system that supports cell aggregation (also referred to as carrier aggregation). In the mobile communication system according to the present invention, the cell aggregation is supported in the uplink and the downlink (for example, up to five cells (also referred to as component carriers) are supported in the uplink and the downlink), and each cell (component carrier) can have a transmission bandwidth (transmission bandwidth equivalent to the LTE) of up to 110 resource blocks.

In FIG. 4, the horizontal axis represents the frequency domain and the vertical axis represents the time domain. Furthermore, FIG. 4 shows that three serving cells (serving cell 1, serving cell 2 and serving cell 3) are aggregated. Here, among a plurality of aggregated serving cells, for example, one serving cell is defined as a Primary cell (Pcell). For example, the primary cell is defined as a serving cell having the function equivalent to that of the cell of the LTE.

In addition, in FIG. 4, the serving cells other than the primary cell are defined as secondary cells (Scell). The secondary cell is a cell having a function limited as compared with the primary cell; for example, the secondary cell can be mainly used for transmitting and receiving the PDSCH and/or the PUSCH.

Here, in the downlink, the carrier corresponding to the serving cell is referred to as a Downlink Component Carrier (DLCC). Moreover, in the uplink, the carrier corresponding to the serving cell is referred to as an Uplink Component Carrier (ULCC).

Moreover, in the downlink, the carrier corresponding to the primary cell is referred to as a Downlink Primary Component Carrier (DLPCC). Furthermore, in the downlink, the carrier corresponding to the secondary cell is referred to as a Downlink Secondary Component Carrier (DLSCC). In addition, in the uplink, the carrier corresponding to the primary cell is referred to as an Uplink Primary Component Carrier (ULPCC). Furthermore, in the uplink, the carrier corresponding to the secondary cell is referred to as an Uplink Secondary Component Carrier (ULSCC).

The base station apparatus 100 can set the primary cell for the mobile station apparatus 200. For example, the base station apparatus 100 can set the primary cell for the mobile station apparatus 200 in a manner specific to the mobile station apparatus (UE-specifically) by using the RRC signaling. Likewise, the base station apparatus 100 can set the secondary cell for the mobile station apparatus 200. For example, the base station apparatus 100 can set the secondary cell for the mobile station apparatus 200 in a manner specific to the mobile station apparatus (UE-specifically) by using the RRC signaling.

Here, for example, the base station apparatus 100 sets both the DLPCC and the ULPCC as the primary cell. Moreover, the base station apparatus 100 also sets both the DLSCC and the ULSCC as the secondary cell. Here, the base station apparatus 100 may set only the DLSCC as the secondary cell.

Furthermore, the frequency or the carrier frequency of the serving cell is referred to as a serving frequency or a serving carrier frequency. In addition, the frequency or the carrier frequency of the primary cell is referred to as a primary frequency or a primary carrier frequency. Further, the frequency or the carrier frequency of the secondary cell is referred to as a secondary frequency or a secondary carrier frequency.

For example, the base station apparatus 100 and the mobile station apparatus 200 first start communication with one serving cell, and thereafter with the RRC signaling from the base station apparatus 100 a set of one primary cell and one or a plurality of serving cells is set for the mobile station apparatus 200.

FIG. 4 shows the serving cell 1 as the primary cell, and the serving cell 2 and the serving cell 3 as the secondary cells. The base station apparatus 100 sets, as the primary cell, the DLCC and the ULCC (DLPCC and ULPCC) of the serving cell 1. Furthermore, the base station apparatus 100 also sets, as the secondary cell, the DLCC and the ULCC (DLSCC-1 and ULSCC-1) of the serving cell 2. Furthermore, the base station apparatus 100 sets, as the secondary cell, only the DLCC (DLSCC-2) of the serving cell 3.

Here, for example, in FIG. 4, in each DLCC, the PDCCH represented by rightwardly upward oblique lines is arranged. In addition, in each DLCC, the PDSCH painted white is arranged. That is, the PDCCH and the PDSCH are time-multiplexed. For example, in each ULCC, the PUCCH painted black is arranged. Furthermore, in each ULCC, the PUSCH represented by horizontal lines is arranged. That is, the PUCCH and the PUSCH are frequency-multiplexed.

In FIG. 4, the base station apparatus 100 and the mobile station apparatus 200 can transmit and receive one PDCCH in one serving cell (DLCC). Moreover, the base station apparatus 100 and the mobile station apparatus 200 can also transmit and receive one PDSCH in one serving cell (DLCC). Furthermore, the base station apparatus 100 and the mobile station apparatus 200 can also transmit and receive one PUSCH in one serving cell (ULCC). Furthermore, the base station apparatus 100 and the mobile station apparatus 200 can transmit and receive one PUCCH in one serving cell (ULCC).

That is, in FIG. 4, the base station apparatus 100 and the mobile station apparatus 200 use three DLCCs, and can transmit and receive three PDCCHs in the same subframe. In addition, the base station apparatus 100 and the mobile station apparatus 200 also use three DLCCs, and can transmit and receive three PDSCHs in the same subframe. Moreover, the base station apparatus 100 and the mobile station apparatus 200 also use two ULCCs, and can transmit and receive two PUSCHs in the same subframe. Here, the base station apparatus 100 and the mobile station apparatus 200 can transmit and receive only one PUCCH in the same subframe.

In FIG. 4, the base station apparatus 100 uses the PDCCH in the primary cell to transmit the downlink assignment including information for the allocation of the resources of the PDSCH in the primary cell. Furthermore, the base station apparatus 100 also uses the PDCCH in the primary cell to transmit the uplink grant including information for the allocation of the resources of the PUSCH in the primary cell. In addition, the base station apparatus 100 also can set, for the mobile station apparatus 200, one serving cell where the downlink assignment including the information for the allocation of the resources of the PDSCH in the secondary cell is transmitted in the PDCCH (can set the link (linkage or linking) of the PDCCH and the PDSCH). Furthermore, the base station apparatus 100 can set, for the mobile station apparatus 200, one serving cell where the uplink grant including the information for the allocation of the resources of the PUSCH in the secondary cell is transmitted in the PDCCH (can set the link (linkage or linking) of the PDCCH and the PUSCH). For example, the base station apparatus 100 uses the RRC signaling and can perform these settings in a manner specific to the mobile station apparatus.

Here, when setting is made by the base station apparatus 100 such that the downlink assignment including information for the allocation of the resources of the PDSCH in a certain secondary cell and the uplink grant including information for the allocation of the resources of the PUSCH are transmitted in different serving cells, the mobile station apparatus 200 does not perform decode processing on the PDCCH in this secondary cell.

For example, in FIG. 4, when setting is made by the base station apparatus 100 such that the downlink assignment including information for the allocation of the resources of the PDSCH in the serving cell 2 and the uplink grant including information for the allocation of the resources of the PUSCH are transmitted in the serving cell 1, and the downlink assignment including information for the allocation of the resources of the PDSCH in the serving cell 3 is transmitted in the serving cell 3, the mobile station apparatus 200 performs the decode processing on the PDCCH in the serving cell 1 and the serving cell 3, and does not perform the decode processing on the PDCCH in the serving cell 2.

The base station apparatus 100 can include, in the downlink assignment, information (Carrier Indicator: Carrier Indicator Field) indicating the serving cell for the allocation of the resources of the PDSCH by the downlink assignment, and transmit it to the mobile station apparatus 200. Moreover, the base station apparatus 100 can include, in the uplink grant, information (carrier indicator) indicating the serving cell for the allocation of resources of the PUSCH by the uplink grant, and transmit it to the mobile station apparatus 200. Here, for example, the base station apparatus 100 uses the RRC signaling and thereby can set, in a manner specific to the mobile station apparatus, whether or not to transmit the downlink assignment with the carrier indicator included therein. Further, for example, the base station apparatus 100 uses the RRC signaling and thereby can set, in a manner specific to the mobile station apparatus, whether or not to transmit the uplink grant with the carrier indicator included therein.

[Transmission of Information Indicating ACK/NACK by Channel Selection]

FIG. 5 is a diagram showing an example of an ACK/NACK table used for the transmission of information indicating ACK/NACK by Channel Selection. The base station apparatus 100 and the mobile station apparatus 200 use an ACK/NACK table as shown in FIG. 5, and thereby transmit and receive information indicating ACK/NACK for the downlink data. Here, the ACK/NACK table as shown in FIG. 5 is previously defined by specifications or the like, and is kept as known information between the base station apparatus 100 and the mobile station apparatus 200.

For example, according to a cell set by the base station apparatus 100, a downlink transmission mode for each cell set by the base station apparatus 100 and the like, the base station apparatus 100 and the mobile station apparatus 200 switch and use a two-bit ACK/NACK table (ACK/NACK table used when information indicating two ACK/NACKs is transmitted), a three-bit ACK/NACK table (ACK/NACK table used when information indicating three ACK/NACKs is transmitted) and a four-bit ACK/NACK table (ACK/NACK table used when information indicating four ACK/NACKs is transmitted).

For example, the base station apparatus 100 uses the RRC signaling and thereby can set cells (which can be said to be the number of cells) used for communication in a manner specific to the mobile station apparatus. Furthermore, for example, the base station apparatus 100 uses the RRC signaling and thereby can set the downlink transmission mode for each cell (used for each cell) in a manner specific to the mobile station apparatus.

In addition, the base station apparatus 100 can set, for the mobile station apparatus 200, the transmission of the information indicating the ACK/NACK by channel selection. For example, the base station apparatus 100 uses the RRC signaling and thereby can set, in a manner specific to the mobile station apparatus, the transmission of the information indicating the ACK/NACK by channel selection.

For example, when two cells are set by the base station apparatus 100, and the transmission (transmission of the PDSCH without the application of the MIMO SM, transmission of one transport block (one code word) using the PDSCH) of the downlink data with a single antenna port is set as the downlink transmission mode for each cell, the base station apparatus 100 and the mobile station apparatus 200 use the two-bit ACK/NACK table.

Moreover, for example, when two cells are set by the base station apparatus 100, and the transmission (transmission of the PDSCH with the application of the MIMO SM, transmission of up to two transport blocks (up to two code words) using the PDSCH) of the downlink data with a multi-antenna port is set as the downlink transmission mode for a certain cell, and the transmission of the downlink data with the signal antenna port is set as the downlink transmission mode for a certain cell, the base station apparatus 100 and the mobile station apparatus 200 use the three-bit ACK/NACK table.

Furthermore, for example, when two cells are set by the base station apparatus 100, and the transmission of the downlink data with the multi-antenna port is set as the downlink transmission mode for each cell, the base station apparatus 100 and the mobile station apparatus 200 use the four-bit ACK/NACK table.

FIG. 5 shows, as an example, the four-bit ACK/NACK table (ACK/NACK table showing 16 types of combinations of ACK/NACKs represented by four bits). In addition, FIG. 5 also shows, as an example, an ACK/NACK table in which information (QPSK signal) of two bits is transmitted in each resource (PUCCH resource).

According to the information indicating the ACK/NACK for (a plurality of) transport blocks transmitted from the base station apparatus 100, the mobile station apparatus 200 selects (determines) one resource among (a plurality of) resources and a bit sequence transmitted in the (selected, determined) resource. The mobile station apparatus 200 transmits, in the selected resource, the selected bit sequence (QPSK signal generated from the bit sequence), and thereby can transmit the information (information on the ACK/NACK for the transport block) indicating the ACK/NACK for the transport block. That is, the resource selected by the mobile station apparatus 200 and the signal point of the QPSK transmitted by the selected resource show the information indicating the ACK/NACK for the transport block transmitted from the base station apparatus 100.

For example, FIG. 5 shows an ACK/NACK table used by the base station apparatus 100 and the mobile station apparatus 200 when the base station apparatus 100 sets two cells and the transmission of the PDSCH with the multi-antenna port is set as the downlink transmission mode for the primary cell and the transmission of the PDSCH with the multi-antenna port is set as the downlink transmission mode for the secondary cell. For example, the base station apparatus 100 and the mobile station apparatus 200 use the ACK/NACK table as shown in FIG. 5 and thereby transmit and receive information indicating the ACK/NACK for two transport blocks transmitted from the base station apparatus 100 in the primary cell and information indicating the ACK/NACK for two transport blocks transmitted in the PDSCH in the secondary cell.

Here, for example, in FIG. 5, the first ACK/NACK can be defined as information indicating the ACK/NACK for the first transport block transmitted in the primary cell and in the PDSCH. Moreover, the second ACK/NACK can be defined as information indicating the ACK/NACK for the second transport block transmitted in the primary cell and in the PDSCH. Furthermore, the third ACK/NACK can be defined as information indicating the ACK/NACK for the first transport block transmitted in the secondary cell and in the PDSCH. In addition, the fourth ACK/NACK can be defined as information indicating the ACK/NACK for the second transport block transmitted in the secondary cell and in the PDSCH.

Likewise, for example, FIG. 5 shows an ACK/NACK table used by the base station apparatus 100 and the mobile station apparatus 200 when the base station apparatus 100 sets three cells and the transmission of the PDSCH with the multi-antenna port is set as the downlink transmission mode for the primary cell and the transmission of the PDSCH with the single antenna port is set as the downlink transmission mode for the two secondary cells, respectively. For example, the base station apparatus 100 and the mobile station apparatus 200 use the ACK/NACK table as shown in FIG. 5 and thereby transmit and receive information indicating the ACK/NACK for one transport block transmitted from the base station apparatus 100 in the primary cell and in the PDSCH and information indicating the ACK/NACK for each transport block transmitted in the PDSCH in the secondary cell.

Here, for example, in FIG. 5, the first ACK/NACK can be defined as information indicating the ACK/NACK for the first transport block transmitted in the primary cell and in the PDSCH. Moreover, the second ACK/NACK can be defined as information indicating the ACK/NACK for the second transport block transmitted in the primary cell and in the PDSCH. Furthermore, the third ACK/NACK can be defined as information indicating the ACK/NACK for the first transport block transmitted in the secondary cell (secondary cell 1) and in the PDSCH. In addition, the fourth ACK/NACK can be defined as information indicating the ACK/NACK for the first transport block transmitted in another secondary cell (secondary cell 2) and in the PDSCH.

Here, which information indicating the ACK/NACK for the PDSCH the base station apparatus 100 and the mobile station apparatus 200 transmit and receive as the first, second, third or fourth ACK/NACK is previously defined by specifications or the like, and is made known between the base station apparatus 100 and the mobile station apparatus 200.

For example, in FIG. 4, when the ACK is indicated for the first transport block transmitted in the primary cell and in the PDSCH, the NACK is indicated for the second transport block transmitted in the primary cell and in the PDSCH, the NACK is indicated for the first transport block transmitted in the secondary cell and in the PDSCH and the NACK is indicated for the second transport block transmitted in the secondary cell and the in PDSCH, the mobile station apparatus 200 selects a resource 1 and a bit sequence of "00" and can transmit, using the resource 1, the QPSK signal corresponding to the bit sequence of "00" to the base station apparatus 100.

Likewise, for example, in FIG. 4, when the ACK is indicated for the first transport block transmitted in the primary cell and in the PDSCH, the ACK is indicated for the second transport block transmitted in the primary cell and in the PDSCH, the NACK is indicated for the first transport block transmitted in the secondary cell and in the PDSCH and the ACK is indicated for the second transport block transmitted in the secondary cell and in the PDSCH, the mobile station apparatus 200 selects a resource 4 and a bit sequence of "01" and can transmit, using the resource 4, the QPSK signal corresponding to the bit sequence of "01" to the base station apparatus 100.

(First Embodiment)

Next, a first embodiment of a mobile communication system using the base station apparatus 100 and the mobile station apparatus 200 will now be described. In the first embodiment, the mobile station apparatus 200 determines the number of resources of the PUCCH explicitly set by the base station apparatus 100, from cells (the number of cells) set by the base station apparatus 100, the downlink transmission mode for the cells set by the base station apparatus 100 and the PDSCH scheduled by the PDCCH (downlink assignment) transmitted by the base station apparatus 100 in the primary cell.

Moreover, the mobile station apparatus 200 determines the number of resources of the PUCCH explicitly set by the base station apparatus 100, from the PDSCH in the secondary cell scheduled by the PDCCH (downlink assignment) transmitted by the base station apparatus 100 in the secondary cell.

Furthermore, the mobile station apparatus 200 determines the number of resources of the PUCCH explicitly set by the base station apparatus 100, from the PDSCH in the secondary cell scheduled by the PDCCH (downlink assignment) transmitted by the base station apparatus 100 in the primary cell or the secondary cell and the PDSCH in the secondary cell scheduled by the PDCCH (downlink assignment) transmitted in the primary cell.

In addition, the PUCCH resource is set by the base station apparatus 100 using the RRC signaling. Moreover, a plurality of candidates of the PUCCH resource is set by the base station apparatus 100 using the RRC signaling; the PUCCH resource is indicated from among the plurality of candidates with resource indication information (ARI: ACK Resource Indicator, Assignment Resource Indicator) transmitted in the PDCCH (downlink assignment).

Furthermore, the plurality of candidates of the PUCCH resource set by the base station apparatus 100 using the RRC signaling is set differently for each of a plurality of secondary cells; the PUCCH resource is indicated with the resource indication information (ARI) independently included in the downlink assignment transmitted in each of the plurality of secondary cells.

In addition, the plurality of candidates of the PUCCH resource set by the base station apparatus 100 using the RRC signaling is set in common for a plurality of secondary cells; the PUCCH resource is indicated with the resource indication information (ARI) independently included in the downlink assignment transmitted in each of the plurality of secondary cells.

Moreover, the plurality of candidates of the PUCCH resource set by the base station apparatus 100 using the RRC signaling is set in common for a plurality of secondary cells; the PUCCH resource is indicated with the resource indication information (ARI) set at the same value included in the downlink assignment transmitted in each of the plurality of secondary cells.

Figure 6:
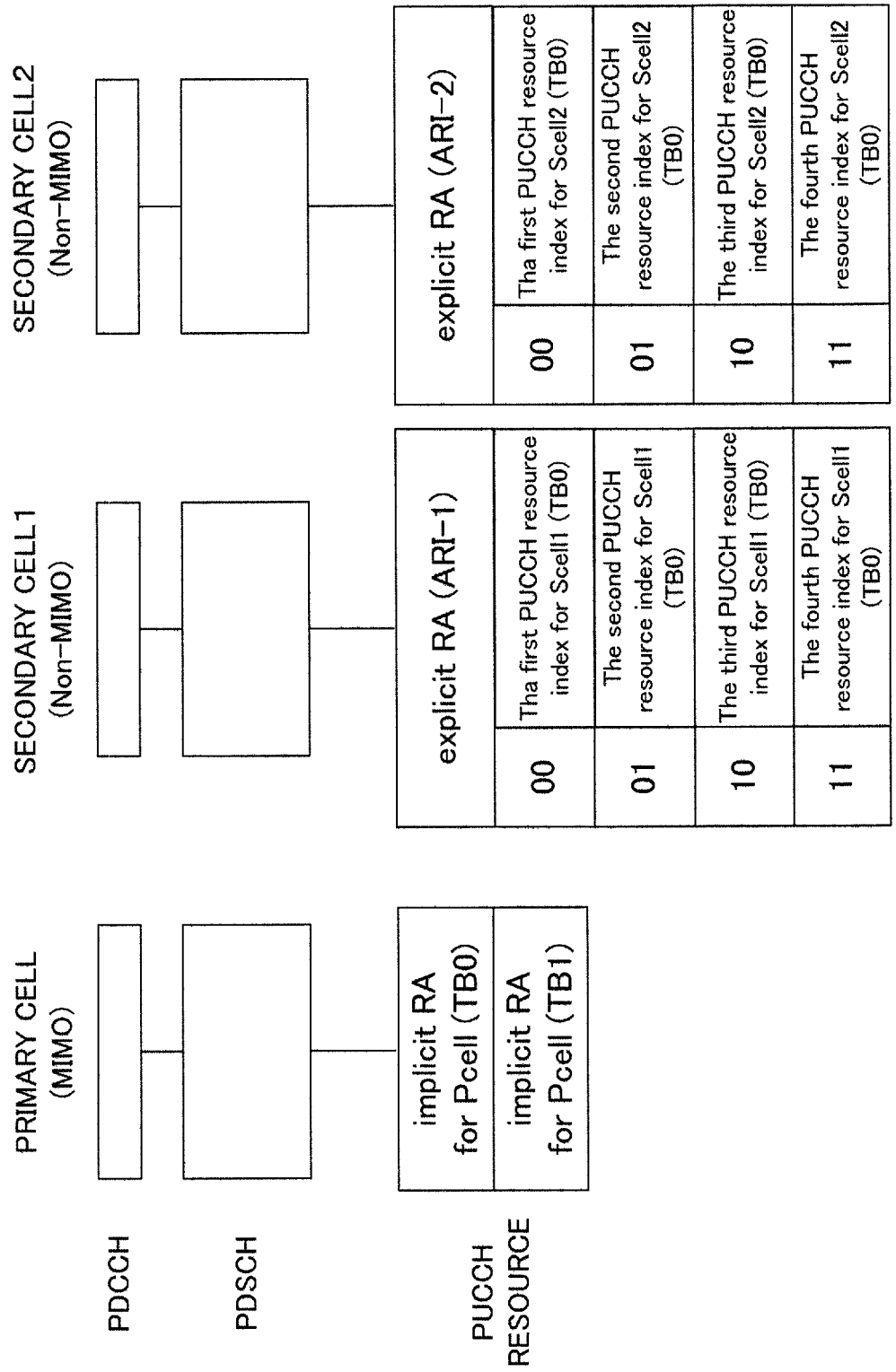
FIG. 6 is a diagram illustrating resource allocation by the base station apparatus 100 of a first embodiment.

FIG. 6 is a diagram illustrating the resource allocation (RA: Resource Allocation, Resource Assignment) by the base station apparatus 100 when the mobile station apparatus 200 transmits the information indicating the ACK/NACK. In FIG. 6, the base station apparatus 100 allocates, to the mobile station apparatus 200, a plurality of resources (for example, four PUCCH resources) for the mobile station apparatus 200 to transmit the information indicating the ACK/NACK, and the mobile station apparatus 200 uses the channel selection indicated above and thereby transmits, to the base station apparatus 100, the information indicating the ACK/NACK for a plurality of transport blocks transmitted from the base station apparatus 100 in the same subframe.

FIG. 6 shows that the base station apparatus 100 sets three cells (the primary cell, the secondary cell 1 and the secondary cell 2) for the mobile station apparatus 200. Furthermore, FIG. 6 also shows that the base station apparatus 100 sets, for the mobile station apparatus 200, as the downlink transmission mode for each cell, the transmission (hereinafter also simply referred to as a MIMO mode) of the PDSCH for the primary cell with the multi-antenna port, the transmission (hereinafter also simply referred to as a Non-MIMO mode) of the PDSCH for the secondary cell 1 with the single antenna port and the transmission of the PDSCH for the secondary cell 2 with the single antenna port.

Specifically, the mobile station apparatus 200 transmits up to two transport blocks (TB0: Transport Block 0, TB1: Transport Block 1; hereinafter also referred to as CW0 and CW1) transmitted from the base station apparatus 100 in the PDSCH in the primary cell, one transport block transmitted in the PDSCH in the secondary cell 1 and information indicating the ACK/NACK for one transport block transmitted in the PDSCH in the secondary cell 2.

Here, the mobile station apparatus 200 uses resources (PUCCH resources) in the primary cell for the transmission of the information indicating the ACK/NACK in subframe n. In other words, the base station apparatus 100 allocates the resources in the primary cell to the mobile station apparatus 200, and the mobile station apparatus 200 uses the resources in the primary cell to transmit the information indicating the ACK/NACK. In the following description, an example will be described in which the mobile station apparatus 200 receives, from the base station apparatus 100, the PDCCH and the PDSCH in subframe n-4 and transmits, to the base station apparatus 100, the information indicating the ACK/NACK for the PDSCH in the subframe n.

FIG. 6 shows that the base station apparatus 100 uses the PDCCH (downlink assignment) in the primary cell to schedule the PDSCH (transmission of up to two transport blocks using the PDSCH) in the primary cell. In addition, FIG. 6 also shows that the base station apparatus 100 uses the PDCCH (downlink assignment) in the secondary cell 1 to schedule the PDSCH (transmission of one code word using the PDSCH) in the secondary cell 1. Moreover, FIG. 6 also shows that the base station apparatus 100 uses the PDCCH (downlink assignment) in the secondary cell 2 to schedule the PDSCH (transmission of one code word using the PDSCH) in the secondary cell 2.

Here, in FIG. 6, when the base station apparatus 100 uses the PDCCH transmitted in the primary cell to schedule the PDSCH in the primary cell, the base station apparatus 100 implicitly allocates the first resources and the second resources in association with the transmitted PDCCH.

Specifically, when the base station apparatus 100 uses the PDCCH transmitted in the primary cell to schedule the PDSCH in the primary cell, the base station apparatus 100 implicitly allocates the first resources (first PUCCH resources) in association with the transmitted PDCCH. For example, when the base station apparatus 100 uses the PDCCH transmitted in the primary cell to schedule the PDSCH in the primary cell, the base station apparatus 100 implicitly allocates the first resources in association with the first CCE used for transmitting the PDCCH.

That is, the first resources implicitly allocated by the base station apparatus 100 indicate resources obtained by a function (which may be simply a calculation formula) including the first CCE (also referred to as the lowest CCE index; which may also be the first CCE number) used in the transmission of the corresponding PDCCH when the mobile station apparatus 200 detects the corresponding PDCCH in the primary cell in subframe n-4 and thereby instructs the transmission of the PDSCH.

For example, the first resources implicitly allocated by the base station apparatus 100 are determined (identified, calculated) by the mobile station apparatus 200 with the first CCE used in the transmission of the PDCCH and an offset value set by the base station apparatus 100 (for example, set using the RRC signaling). For example, the first resources implicitly allocated by the base station apparatus 100 are determined by associating an index obtained from the function including the first CCE used in the transmission of the PDCCH and the offset value with the index of the first resources.

Specifically, when the mobile station apparatus 200 detects the corresponding PDCCH in the primary cell in the subframe n-4 and thereby is instructed to transmit the PDSCH, the mobile station apparatus 200 uses the first CCE (which may be the first CCE and the offset value) used in the transmission of the corresponding PDCCH and thereby can determine (identify, calculate) the first resources implicitly allocated by the base station apparatus 100.

Likewise, the base station apparatus 100, when using the PDCCH transmitted in the primary cell to schedule the PDSCH in the primary cell, implicitly allocates the second resources (second PUCCH resources) in association with the transmitted PDCCH. For example, the base station apparatus 100, when using the PDCCH transmitted in the primary cell to schedule the PDSCH in the primary cell, implicitly allocates the first resources in association with the first CCE+1 (obtained by adding one to the first CCE) used in the transmission of the PDCCH.

That is, the second resources implicitly allocated by the base station apparatus 100 indicate resources obtained by a function (which may be simply a calculation formula) including the first CCE+1 (CCE index of the lowest CCE index+1; which may be obtained by adding one to the first CCE) used in the transmission of the corresponding PDCCH when the mobile station apparatus 200 detects the corresponding PDCCH in the primary cell in the subframe n-4 and thereby is instructed to transmit the PDSCH.

For example, the second resources implicitly allocated by the base station apparatus 100 are determined (identified, calculated) by the mobile station apparatus 200 with the first CCE+1 used in the transmission of the PDCCH and the offset value set by the base station apparatus 100 (for example, set using the RRC signaling). For example, the second resources implicitly allocated by the base station apparatus 100 are determined by associating an index obtained from the function including the first CCE+1 used in the transmission of the PDCCH and the offset value with the index of the second resources.

Specifically, when the mobile station apparatus 200 detects the corresponding PDCCH in the primary cell in the subframe n-4 and thereby is instructed to transmit the PDSCH, the mobile station apparatus 200 uses the first CCE+1 (which may be the first CCE+1 and the offset value) used in the transmission of the corresponding PDCCH and thereby can determine (identify, calculate) the second resources implicitly allocated by the base station apparatus 100. In other words, when the mobile station apparatus 200 detects the corresponding PDCCH in the primary cell and thereby is instructed to transmit the PDSCH, the mobile station apparatus 200 uses the first CCE used in the transmission of the corresponding PDCCH and thereby can determine two resources. Specifically, one of the two resources is determined corresponding to the first CCE used in the transmission of the PDCCH; the other of the two resources is determined corresponding to the first CCE+1 used in the transmission of the PDCCH.

Here, although, as the example of the method of implicitly allocating the second resources by the base station apparatus 100, the utilization of the first CCE+1 used in the transmission of the PDCCH has been described, when the base station apparatus 100 allocates the second resources, the base station apparatus 100 may naturally utilize another CCE other than that used in the transmission of the PDCCH. For example, the base station apparatus 100 may utilize, as the method of implicitly allocating the second resources, the first CCE−1 used in the transmission of the PDCCH and the first CCE+2. Here, when the base station apparatus 100 utilizes, as the method of implicitly allocating the second resources, the first CCE+1 used in the transmission of the PDCCH, it is easier to perform scheduling when the resources are allocated to a plurality of mobile station apparatuses 200, and it is possible to more efficiently allocate the resources.

Furthermore, in FIG. 6, when the base station apparatus 100 uses the PDCCH transmitted in the secondary cell to perform scheduling on the PDSCH in the secondary cell, the base station apparatus 100 previously and explicitly sets the resources (PUCCH resources) for the mobile station apparatus 200.

For example, in FIG. 6, when the base station apparatus 100 uses the PDCCH transmitted in the secondary cell 1 to perform scheduling on the PDSCH in the secondary cell 1, the base station apparatus 100 explicitly sets third resources (third PUCCH resources) for the mobile station apparatus 200. Furthermore, for example, when the base station apparatus 100 uses the PDCCH transmitted in the secondary cell 2 to perform scheduling on the PDSCH in the secondary cell 2, the base station apparatus 100 explicitly sets fourth resources (fourth PUCCH resources) for the mobile station apparatus 200.

Here, the resources explicitly set (allocated, indicated) by the base station apparatus 100 include resources set by the base station apparatus 100 using the RRC signaling. In addition, the resources explicitly set by the base station apparatus 100 include resources, which will be described later, that are indicated by the base station apparatus 100 using resource indication information (ARI: ACK Resource Indicator, Assignment Resource Indicator).

Specifically, the resources explicitly set by the base station apparatus 100 indicate resources set by the RRC signaling from the base station apparatus 100 when the mobile station apparatus 200 detects the corresponding PDCCH in the secondary cell in the subframe n-4 and thereby is instructed to transmit the PDSCH.

In other words, when the mobile station apparatus 200 detects the corresponding PDCCH in the secondary cell in the subframe n-4 and thereby is instructed to transmit the PDSCH, the resources are set by the RRC signaling from the base station apparatus 100.

Here, the base station apparatus 100, when allocating the resources, sets, for the mobile station apparatus 200, candidates (a plurality of sets of resources that becomes candidates of the resources) of the resources using the RRC signaling previously, and uses the PDCCH transmitted in the secondary cell to perform scheduling on the PDSCH, the base station apparatus 100 may explicitly indicate the resources by transmitting the resource indication information (ARI, for example, indicated by the information of two bits) using the PDCCH (downlink assignment). For the mobile station apparatus 200, the base station apparatus 100 uses the ARI among a plurality of candidates of the resources set previously, and thereby can explicitly indicate actually allocated resources.

Here, for example, for the ARI, a field in which the downlink control information transmitted in the PDCCH (downlink assignment) is mapped is used (reused). Specifically, when the base station apparatus 100 uses the PDCCH transmitted in the secondary cell to schedule the PDSCH, the base station apparatus 100 and the mobile station apparatus 200 change the interpretation from the field in which downlink control information (the downlink control information described above) transmitted in the PDCCH is mapped to a field in which the ARI is mapped and recognize (identify) the field. For example, the base station apparatus 100 and the mobile station apparatus 200 can recognize a field in which the TPC command (TPC command for PUCCH; indicated by the information of two bits) for the PUCCH transmitted in the PDCCH (downlink assignment) is mapped as the field in which the ARI is mapped.

That is, when the base station apparatus 100 uses the PDCCH transmitted in the primary cell to schedule the PDSCH, the base station apparatus 100 and the mobile station apparatus 200 recognize a value set for the field in which the TPC command (TPC command for PUCCH) for the PUCCH transmitted in the PDCCH is mapped as a value for transmission power control on the PUCCH. Moreover, when the base station apparatus 100 uses the PDCCH transmitted in the secondary cell to schedule the PDSCH, the base station apparatus 100 and the mobile station apparatus 200 recognize the value set for the field in which the TPC command for the PUCCH (TPC command for PUCCH) transmitted in the PDCCH is mapped as a value (ARI) representing the resources indicated by the base station apparatus 100.

FIG. 6 shows that, when the base station apparatus 100 uses the PDCCH transmitted in the secondary cell 1 to schedule the PDSCH in the secondary cell 1, the base station apparatus 100 previously sets, for the mobile station apparatus 200, four resources (represented by explicit RA (ARI-1)) as the candidates of the third resource, and indicates the actually allocated third resource among the four resources by the ARI-1.

Furthermore, likewise, FIG. 6 also shows that, when the base station apparatus 100 uses the PDCCH transmitted in the secondary cell 2 to schedule the PDSCH in the secondary cell 2, the base station apparatus 100 previously sets, for the mobile station apparatus 200, four resources (represented by explicit RA (ARI-2)) as the candidates of the fourth resource, and indicates the actually allocated fourth resource among the four resources by the ARI-2.

Here, in FIG. 6, the base station apparatus 100 sets, for each secondary cell, different resource candidates (a plurality of sets of resources as the candidates of the third resources, a plurality of sets of resources as the candidates of the fourth resource), and uses the ARI (ARI-1, ARI-2) transmitted in each of the PDCCHs of the secondary cells (secondary cell 1, secondary cell 2) to indicate each different resource.

In other words, the base station apparatus 100 transmits the independent ARI in each of the PDCCHs of the secondary cells, and thereby can indicate, for each secondary cell, one resource (third resource, fourth resource) among different resource candidates.

Figure 7:
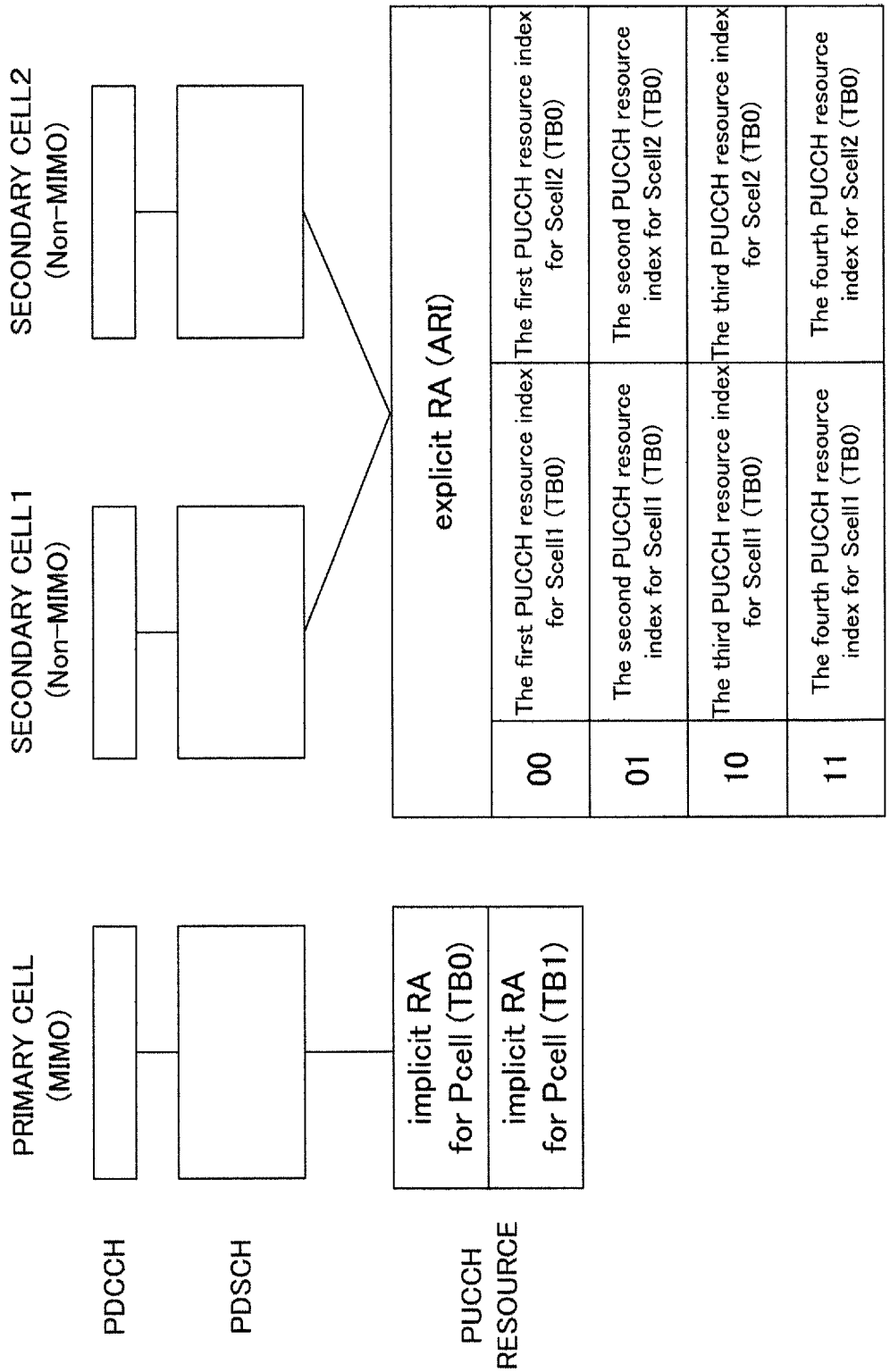
FIG. 7 is another diagram illustrating the resource allocation by the base station apparatus 100 of the first embodiment.

FIG. 7 is, as with FIG. 6, a diagram illustrating the resource allocation by the base station apparatus 100, and differs from FIG. 6 in the method of explicitly allocating resources using the ARI by the base station apparatus 100. In FIG. 7, when the base station apparatus 100 uses the ARI to indicate resources, the base station apparatus 100 previously sets common resource candidates (a plurality of sets of resources as the third resource or the fourth resource) in the secondary cells, and uses the ARI (ARI-1, ARI-2) transmitted in each of the PDCCHs of the secondary cells (secondary cell 1, secondary cell 2) to indicate each different resource.

In other words, the base station apparatus 100 transmits the independent ARI in each of the PDCCHs of the secondary cells, and thereby can indicate each resource (third resource, fourth resource) from among common resource candidates in the secondary cells.

In addition, in FIG. 7, the base station apparatus 100 may set common resource candidates (a plurality of sets of resources as the third resource or the fourth resource; which can also be said to be sets of resource groups including a plurality of resource candidates to be indicated), and indicate one resource group by setting the same value at the ARI (ARI-1, ARI-2) transmitted in each of the PDCCHs transmitted in the secondary cell (secondary cell 1, secondary cell 2).

In other words, the base station apparatus 100 transmits the ARI set at the same value in each of the PDCCHs of the secondary cell, and thereby can indicate one resource group (resource group indicating the third resource or the fourth resource) from among the sets of resource groups including a plurality of resource candidates to be indicated. Here, the mobile station apparatus 200 assumes that the same value is set at the ARI transmitted in the PDCCH (downlink assignment) of the secondary cell.

As has been described above, in FIGS. 6 and 7, when the base station apparatus 100 sets, as the downlink transmission mode for the primary cell, the MIMO mode, and uses the PDCCH (downlink assignment) transmitted in the primary cell to schedule the PDSCH (the transmission of up to two transport blocks using the PDSCH) in the primary cell, the base station apparatus 100 implicitly allocates the first resource and the second resource (two PUCCH resources).

In other words, when the base station apparatus 100 schedules the PDSCH (the transmission of up to two transport blocks using the PDSCH) in the cell where the MIMO mode is set using the PDCCH (downlink assignment) transmitted in the primary cell, the base station apparatus 100 implicitly allocates two PUCCH resources.

Here, as described below, when the base station apparatus 100 schedules the PDSCH (the transmission of one transport block using the PDSCH) in the cell where the Non-MIMO mode is set using the PDCCH (downlink assignment) transmitted in the primary cell, the base station apparatus 100 implicitly allocates one PUCCH resource.

Moreover, when the base station apparatus 100 sets the Non-MIMO mode as the downlink transmission mode for the secondary cell 1, and schedules the PDSCH (the transmission of one transport block using the PDSCH) in the secondary cell 1 using the PDCCH (downlink assignment) transmitted in the secondary cell 1, the base station apparatus 100 explicitly sets the third resource (one PUCCH resource).

Furthermore, when the base station apparatus 100 sets the Non-MIMO mode as the downlink transmission mode for the secondary cell 2, and schedules the PDSCH (the transmission of one transport block using the PDSCH) in the secondary cell 2 using the PDCCH (downlink assignment) transmitted in the secondary cell 2, the base station apparatus 100 explicitly sets the fourth resource (one PUCCH resource).

In other words, when the base station apparatus 100 schedules the PDSCH (the transmission of one transport block using the PDSCH) in the cell where the Non-MIMO mode is set using the PDCCH (downlink assignment) transmitted in the secondary cell, the base station apparatus 100 explicitly sets one PUCCH resource.

Here, as described below, when the base station apparatus 100 schedules the PDSCH (the transmission of up to two transport blocks using the PDSCH) in the cell where the MIMO mode is set using the PDCCH (downlink assignment) transmitted in the secondary cell, the base station apparatus 100 explicitly sets two PUCCH resources.

Here, in FIGS. 6 and 7, the first resource can be associated with the resource 1 in FIG. 5. Furthermore, the second resource can be associated with the resource 2 in FIG. 5. In addition, the third resource can be associated with the resource 3 in FIG. 5. Moreover, the fourth resource can be associated with the resource 4 in FIG. 5. As described above, the mobile station apparatus 200 uses the channel selection to transmit the information indicating the ACK/NACKs for a plurality of transport blocks transmitted from the base station apparatus 100 in the same subframe.

Figure 8:
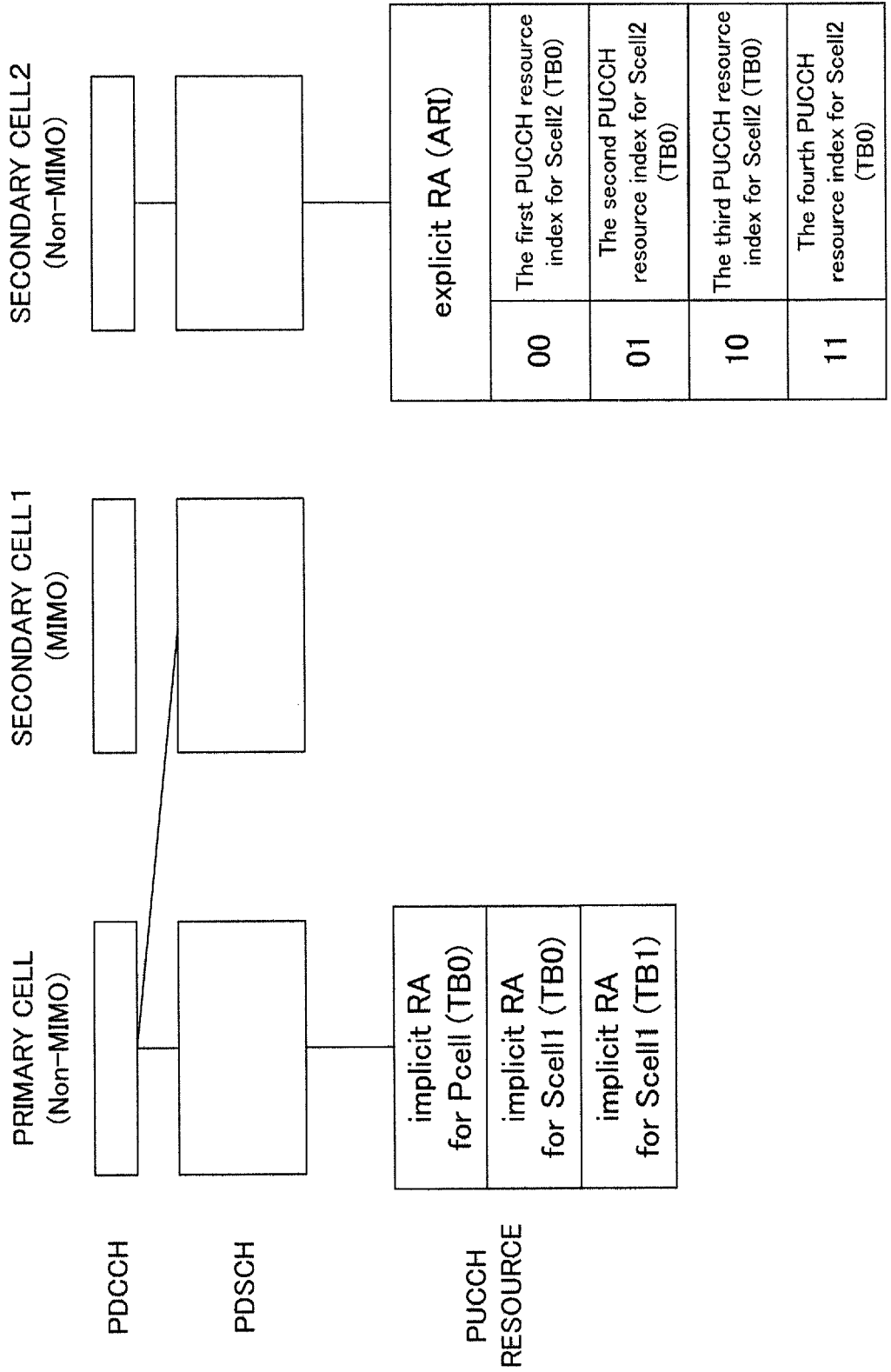
FIG. 8 is another diagram illustrating the resource allocation by the base station apparatus 100 of the first embodiment.

FIG. 8 is a diagram illustrating the resource allocation by the base station apparatus 100 when the mobile station apparatus 200 transmits the information indicating the ACK/NACK. FIG. 8 shows that the base station apparatus 100 sets the three cells (the primary cell, the secondary cell 1 and the secondary cell 2) for the mobile station apparatus 200. Furthermore, FIG. 8 also shows that the base station apparatus 100 sets, for the mobile station apparatus 200, as the downlink transmission mode for each cell, the Non-MIMO mode for the primary cell, the MIMO mode for the secondary cell 1 and the Non-MIMO mode for the secondary cell 2.

In other words, the mobile station apparatus 200 transmits the information indicating ACK/NACKs for one transport block transmitted from the base station apparatus 100 in the PDSCH in the primary cell, up to two transport blocks transmitted in the PDSCH in the secondary cell 1 and one transport block of the PDSCH transmitted in the secondary cell 2.

FIG. 8 shows that the base station apparatus 100 uses the PDCCH (downlink assignment) in the primary cell to schedule the PDSCH (the transmission of one transport block using the PDSCH) in the primary cell. In addition, FIG. 8 also shows that the base station apparatus 100 uses the PDCCH (downlink assignment) in the primary cell to schedule the PDSCH (the transmission of up to two transport blocks using the PDSCH) in the secondary cell 1. Moreover, FIG. 8 also shows that the base station apparatus 100 uses the PDCCH (downlink assignment) in the secondary cell 2 to schedule the PDSCH (the transmission of one transport block using the PDSCH) in the secondary cell 2.

Here, in FIG. 8, when the base station apparatus 100 uses the PDCCH transmitted in the primary cell to schedule the PDSCH in the primary cell, the base station apparatus 100 implicitly allocates the first resource (first PUCCH resource) in association with the transmitted PDCCH. For example, when the base station apparatus 100 uses the PDCCH transmitted in the primary cell to schedule the PDSCH in the primary cell, the base station apparatus 100 uses the first CCE (which may be the first CCE and the offset value) used in the transmission of the PDCCH to implicitly allocate the first resource.

Furthermore, in FIG. 8, when the base station apparatus 100 uses the PDCCH transmitted in the primary cell to schedule the PDSCH in the secondary cell 1, the base station apparatus 100 implicitly allocates the second resource (second PUCCH resource) and the third resource (third PUCCH resource) in association with the transmitted PDCCH.

In other words, when the base station apparatus 100 uses the PDCCH transmitted in the primary cell to schedule the PDSCH in the secondary cell 1, the base station apparatus 100 implicitly allocates the second resource (second PUCCH resource) in association with the transmitted PDCCH. For example, when the base station apparatus 100 uses the PDCCH transmitted in the primary cell to schedule the PDSCH in the secondary cell 1, the base station apparatus 100 uses the first CCE (which may be the first CCE and the offset value) used in the transmission of the PDCCH to implicitly allocate the second resource.

Likewise, when the base station apparatus 100 uses the PDCCH transmitted in the primary cell to schedule the PDSCH in the secondary cell 1, the base station apparatus 100 implicitly allocates the third resource (third PUCCH resource) in association with the transmitted PDCCH. For example, when the base station apparatus 100 uses the PDCCH transmitted in the primary cell to schedule the PDSCH in the secondary cell 1, the base station apparatus 100 implicitly allocates the third resource in association with the first CCE+1 (obtained by adding one to the first CCE) used in the transmission of the PDCCH.

Furthermore, in FIG. 8, when the base station apparatus 100 uses the PDCCH transmitted in the secondary cell 2 to schedule the PDSCH in the secondary cell 2, the base station apparatus 100 previously and explicitly sets the fourth resource (fourth PUCCH resource) for the mobile station apparatus 200.

For example, when the base station apparatus 100 uses the PDCCH transmitted in the secondary cell 2 to schedule the PDSCH in the secondary cell 2, the base station apparatus 100 explicitly sets the fourth resource using the RRC signaling. In addition, when the base station apparatus 100 previously uses the RRC signaling to set the candidates of the fourth resource for the mobile station apparatus 200, and uses the PDCCH transmitted in the secondary cell 2 to schedule the PDSCH in the secondary cell 2, the base station apparatus 100 can explicitly indicate, with the resource indication information (ARI) transmitted in the PDCCH, the actually allocated fourth resource.

As has been described above, in FIG. 8, when the base station apparatus 100 sets, as the downlink transmission mode for the primary cell, the Non-MIMO mode, and uses the PDCCH (downlink assignment) transmitted in the primary cell to schedule the PDSCH (the transmission of one transport block using the PDSCH) in the primary cell, the base station apparatus 100 implicitly allocates the first resource (one PUCCH resource) to the mobile station apparatus 200.

In other words, when the base station apparatus 100 schedules the PDSCH (the transmission of one transport block using the PDSCH) in the cell where the Non-MIMO mode is set using the PDCCH (downlink assignment) transmitted in the primary cell, the base station apparatus 100 implicitly allocates one PUCCH resource.

Moreover, when the base station apparatus 100 sets the MIMO mode as the downlink transmission mode for the secondary cell 1, and schedules the PDSCH (the transmission of up to two transport blocks using the PDSCH) in the secondary cell 1 using the PDCCH (downlink assignment) transmitted in the primary cell, the base station apparatus 100 implicitly allocates the second resource and the third resource (two PUCCH resources) to the mobile station apparatus 200.

In other words, when the base station apparatus 100 schedules the PDSCH (the transmission of up to two transport blocks using the PDSCH) in the cell where the MIMO mode is set using the PDCCH (downlink assignment) transmitted in the primary cell, the base station apparatus 100 implicitly allocates two PUCCH resources.

Furthermore, when the base station apparatus 100 sets the Non-MIMO mode as the downlink transmission mode for the secondary cell 2, and schedules the PDSCH (the transmission of one transport block using the PDSCH) in the secondary cell 2 using the PDCCH (downlink assignment) transmitted in the secondary cell 2, the base station apparatus 100 explicitly sets the fourth resource (one PUCCH resource) to the mobile station apparatus 200.

In other words, when the base station apparatus 100 schedules the PDSCH (the transmission of one transport block using the PDSCH) in the cell where the Non-MIMO mode is set using the PDCCH (downlink assignment) transmitted in the secondary cell, the base station apparatus 100 explicitly sets one PUCCH resource.

Here, in FIG. 8, the first resource can be associated with the resource 1 in FIG. 5. In addition, the second resource can be associated with the resource 2 in FIG. 5. Moreover, the third resource can be associated with the resource 3 in FIG. 5. Furthermore, the fourth resource can be associated with the resource 4 in FIG. 5. As described above, the mobile station apparatus 200 uses the channel selection to transmit the information indicating the ACK/NACKs for a plurality of transport blocks transmitted from the base station apparatus 100 in the same subframe.

Figure 9:
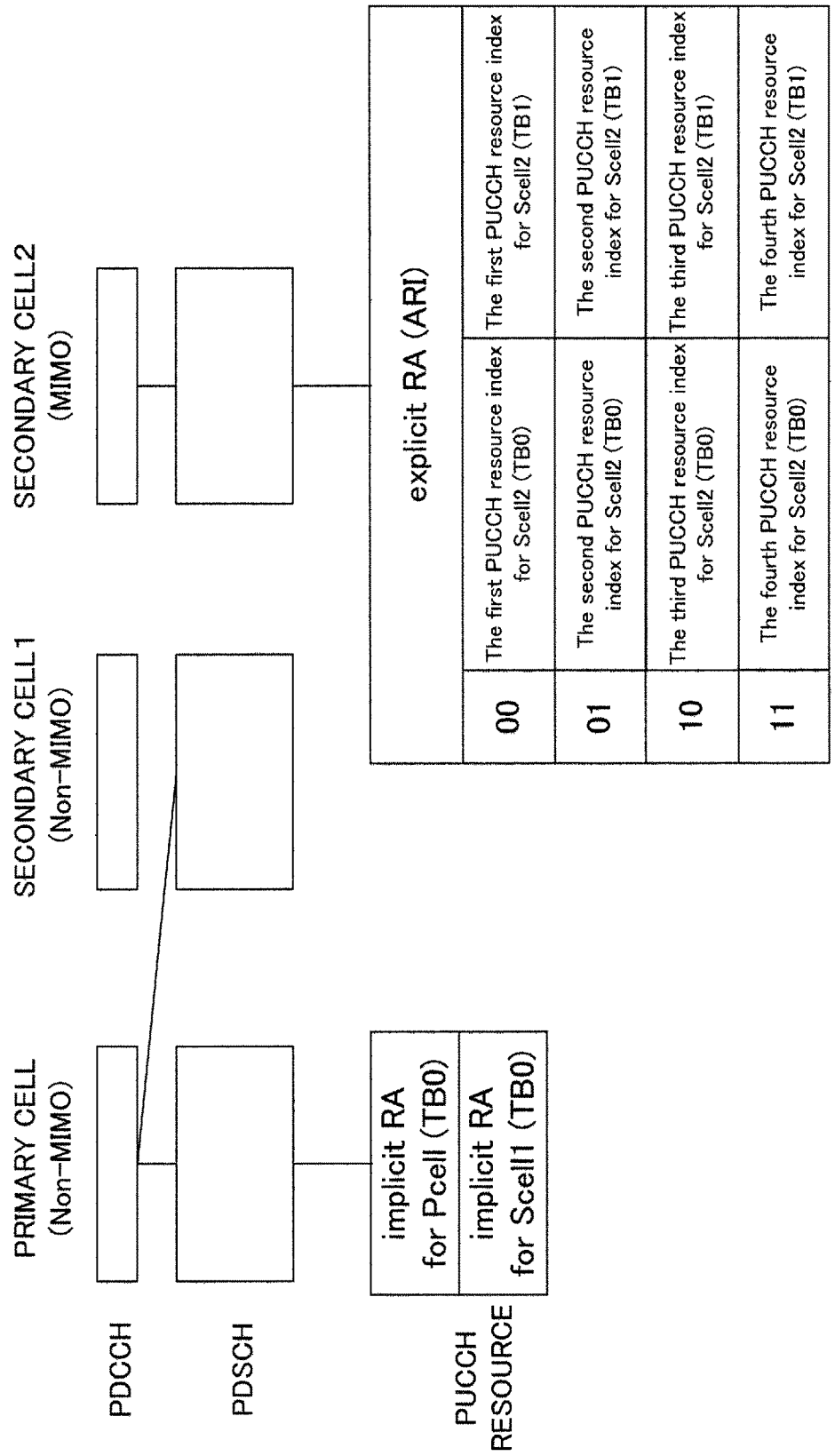
FIG. 9 is another diagram illustrating the resource allocation by the base station apparatus 100 of the first embodiment.

FIG. 9 is a diagram illustrating the resource allocation by the base station apparatus 100 when the mobile station apparatus 200 transmits the information indicating the ACK/NACK. FIG. 9 shows that the base station apparatus 100 sets the three cells (the primary cell, the secondary cell 1 and the secondary cell 2) for the mobile station apparatus 200. In addition, FIG. 9 also shows that the base station apparatus 100 sets, for the mobile station apparatus 200, as the downlink transmission mode for each cell, the Non-MIMO mode for the primary cell, the Non-MIMO mode for the secondary cell 1 and the MIMO mode for the secondary cell 2.

In other words, the mobile station apparatus 200 transmits the information indicating ACK/NACKs for one transport block transmitted from the base station apparatus 100 in the PDSCH in the primary cell, one transport block transmitted in the PDSCH in the secondary cell 1 and up to two transport blocks transmitted in the PDSCH in the secondary cell 2.

FIG. 9 shows that the base station apparatus 100 uses the PDCCH (downlink assignment) in the primary cell to schedule the PDSCH (the transmission of one transport block using the PDSCH) in the primary cell. Moreover, FIG. 9 also shows that the base station apparatus 100 uses the PDCCH (downlink assignment) in the primary cell to schedule the PDSCH (the transmission of one transport block using the PDSCH) in the secondary cell 1. Furthermore, FIG. 9 also shows that the base station apparatus 100 uses the PDCCH (downlink assignment) in the secondary cell 2 to schedule the PDSCH (the transmission of up to two transport blocks using the PDSCH) in the secondary cell 2.

Here, in FIG. 9, when the base station apparatus 100 uses the PDCCH transmitted in the primary cell to schedule the PDSCH in the primary cell, the base station apparatus 100 implicitly allocates the first resource (first PUCCH resource) in association with the transmitted PDCCH. For example, when the base station apparatus 100 uses the PDCCH transmitted in the primary cell to schedule the PDSCH in the primary cell, the base station apparatus 100 uses the first CCE (which may be the first CCE and the offset value) used in the transmission of the PDCCH to implicitly allocate the first resource.

In addition, in FIG. 9, when the base station apparatus 100 uses the PDCCH transmitted in the primary cell to schedule the PDSCH in the secondary cell 1, the base station apparatus 100 implicitly allocates the second resource (second PUCCH resource) in association with the transmitted PDCCH. For example, when the base station apparatus 100 uses the PDCCH transmitted in the primary cell to schedule the PDSCH in the secondary cell 1, the base station apparatus 100 uses the first CCE (which may be the first CCE and the offset value) used in the transmission of the PDCCH to implicitly allocate the second resource.

Furthermore, in FIG. 9, when the base station apparatus 100 uses the PDCCH transmitted in the secondary cell 2 to schedule the PDSCH in the secondary cell 2, the base station apparatus 100 previously and explicitly sets the third resource (third PUCCH resource) and the fourth resource (fourth PUCCH resource) for the mobile station apparatus 200.

For example, when the base station apparatus 100 uses the PDCCH transmitted in the secondary cell 2 to schedule the PDSCH in the secondary cell 2, the base station apparatus 100 explicitly sets the third resource and the fourth resource using the RRC signaling. Moreover, when the base station apparatus 100 previously uses the RRC signaling to set the candidates of the third resource and the candidates of the fourth resource for the mobile station apparatus 200, and uses the PDCCH transmitted in the secondary cell 2 to schedule the PDSCH in the secondary cell 2, the base station apparatus 100 can explicitly indicate, with the resource indication information (ARI) transmitted in the PDCCH, the actually allocated third and fourth resources.

Here, in FIG. 9, when the base station apparatus 100 uses the ARI to indicate resources, the base station apparatus 100 may previously set resource candidates different for each of the indicated resources (a plurality of sets of resources as the candidates of the third resource, a plurality of sets of resources as the candidates of the fourth resource), use the ARI transmitted in the PDCCH of the secondary cell 2 and indicate each different resource. In other words, the base station apparatus 100 uses one value set in the ARI transmitted in the PDCCH of the secondary cell 2, and thereby can indicate two resources. Specifically, the mobile station apparatus 200 can determine, according to one value set in the ARI, one of the two resources from among a plurality of sets of resources that is the candidates of the third resource, and determine the other of the two resources from among a plurality of sets of resources that is the candidates of the fourth resource. As described above, the base station apparatus 100 uses one value set in the ARI to indicate two resources, and thereby can more efficiently indicate resources.

In other words, the base station apparatus 100 transmits the ARI in the PDCCH of the secondary cell 2, and thereby can indicate each resource (the third resource or the fourth resource) of the resource candidates different for each of the indicated resources.

Furthermore, in FIG. 9, the base station apparatus 100, when using the ARI to indicate resources, may previously set common resource candidates for the indicated resources (a plurality of sets of resources as the candidates of the third resource and as the candidates of the fourth resource; which can also be said to be sets of resource groups including a plurality of candidates of the indicated resources), use the ARI transmitted in the PDCCH of the secondary cell 2 and indicate one resource group.

In other words, the base station apparatus 100 transmits the ARI in the PDCCH of the secondary cell 2, and thereby can indicate one resource group (resource group indicating the third resource or the fourth resource) from among the sets of resource groups including a plurality of candidates of the indicated resources.

As has been described above, in FIG. 9, when the base station apparatus 100 sets the Non-MIMO mode as the downlink transmission mode for the primary cell, and uses the PDCCH (downlink assignment) transmitted in the primary cell to schedule the PDSCH (the transmission of one transport block using the PDSCH) in the primary cell, the base station apparatus 100 implicitly allocates the first resource (one PUCCH resource).

In addition, when the base station apparatus 100 sets the Non-MIMO mode as the downlink transmission mode for the secondary cell 1, and uses the PDCCH (downlink assignment) transmitted in the primary cell to schedule the PDSCH (the transmission of one transport block using the PDSCH), the base station apparatus 100 implicitly allocates the second resource (one PUCCH resource).

In other words, when the base station apparatus 100 schedules the PDSCH (the transmission of one transport block using the PDSCH) in the cell where the Non-MIMO mode is set using the PDCCH (downlink assignment) transmitted in the primary cell, the base station apparatus 100 implicitly allocates one PUCCH resource.

In other words, when the base station apparatus 100 schedules each of the PDSCHs (the transmission of one transport block using the PDSCH) in a plurality of cells where the Non-MIMO mode is set using the PDCCH (downlink assignment) transmitted in the primary cell, the base station apparatus 100 implicitly allocates as many PUCCH resources as the transport blocks (which may be code words, the number of code words or the number of transport blocks) transmitted in the PDSCH scheduled by the PDCCH transmitted in the primary cell.

Moreover, when the base station apparatus 100 sets the MIMO mode as the downlink transmission mode for the secondary cell 2, and schedules the PDSCH (the transmission of up to two transport blocks using the PDSCH) in the secondary cell 2 using the PDCCH (downlink assignment) transmitted in the secondary cell 2, the base station apparatus 100 explicitly sets the third resource and the fourth resource (two PUCCH resources).

In other words, when the base station apparatus 100 schedules the PDSCH (the transmission of up to two transport blocks using the PDSCH) in the cell where the MIMO mode is set using the PDCCH (downlink assignment) transmitted in the secondary cell 2, the base station apparatus 100 explicitly sets two PUCCH resources.

Here, in FIG. 9, the first resource can be associated with the resource 1 in FIG. 5. Furthermore, the second resource can be associated with the resource 2 in FIG. 5. In addition, the third resource can be associated with the resource 3 in FIG. 5. Moreover, the fourth resource can be associated with the resource 4 in FIG. 5. As described above, the mobile station apparatus 200 uses the channel selection to transmit the information indicating the ACK/NACKs for a plurality of transport blocks transmitted from the base station apparatus 100 in the same subframe.

Figure 10:
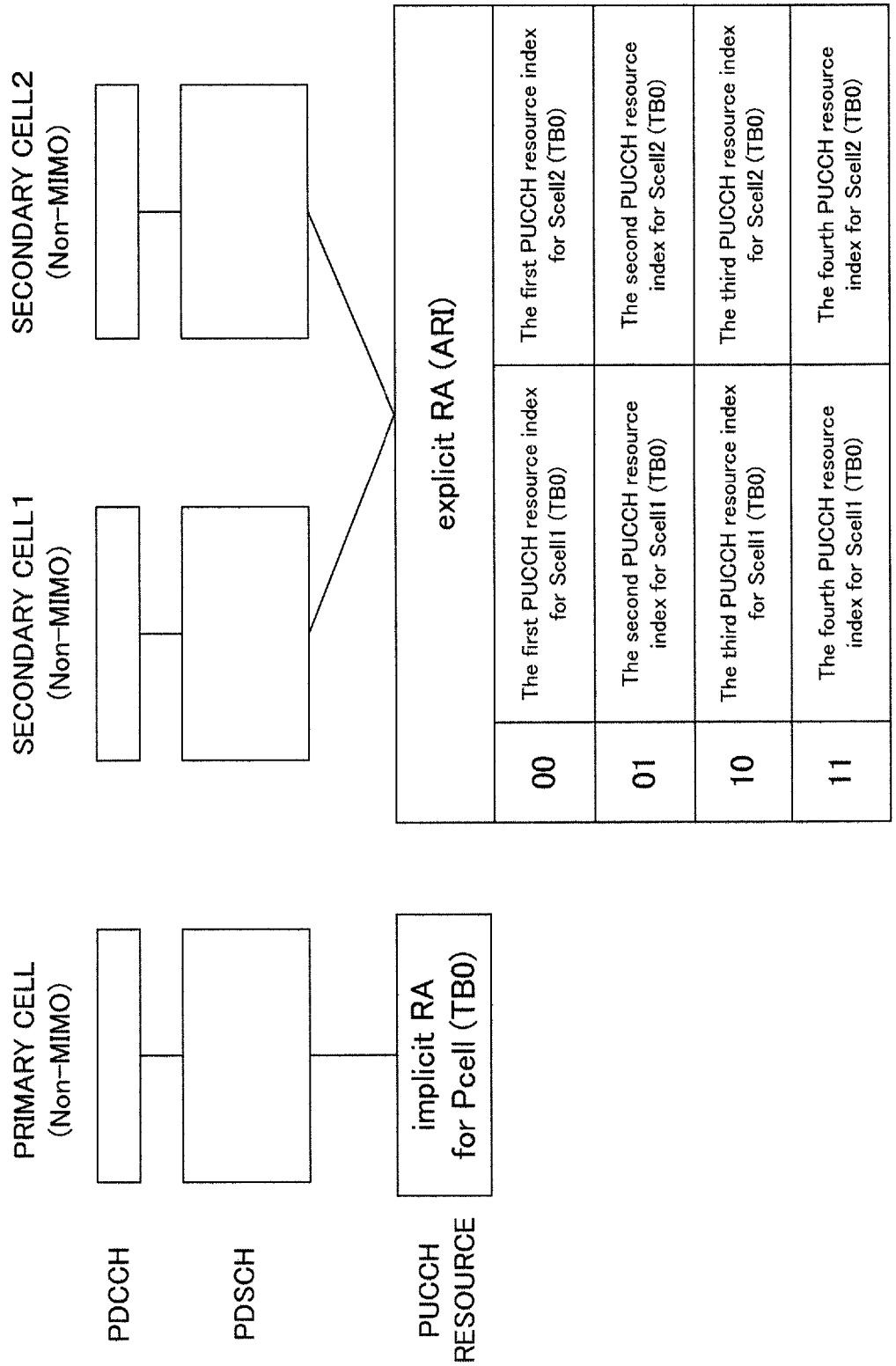
FIG. 10 is another diagram illustrating the resource allocation by the base station apparatus 100 of the first embodiment.

FIG. 10 is a diagram illustrating the resource allocation by the base station apparatus 100 when the mobile station apparatus 200 transmits the information indicating the ACK/NACK. FIG. 10 shows that the base station apparatus 100 sets the three cells (the primary cell, the secondary cell 1 and the secondary cell 2) for the mobile station apparatus 200. Furthermore, FIG. 10 also shows that the base station apparatus 100 sets, for the mobile station apparatus 200, as the downlink transmission mode for each cell, the Non-MIMO mode for the primary cell, the Non-MIMO mode for the secondary cell 1 and the Non-MIMO mode for the secondary cell 2.

In other words, the mobile station apparatus 200 transmits the information indicating ACK/NACKs for one transport block transmitted from the base station apparatus 100 in the PDSCH in the primary cell, one transport block transmitted in the PDSCH in the secondary cell 1 and one transport block of the PDSCH transmitted in the secondary cell 2.

FIG. 10 shows that the base station apparatus 100 uses the PDCCH (downlink assignment) in the primary cell to schedule the PDSCH (the transmission of one transport block using the PDSCH) in the primary cell. In addition, FIG. 10 also shows that the base station apparatus 100 uses the PDCCH (downlink assignment) in the primary cell to schedule the PDSCH (the transmission of one transport block using the PDSCH) in the secondary cell 1. Moreover, FIG. 10 also shows that the base station apparatus 100 uses the PDCCH (downlink assignment) in the secondary cell 2 to schedule the PDSCH (the transmission of one transport block using the PDSCH) in the secondary cell 2.

Here, in FIG. 10, the base station apparatus 100, when using the PDCCH transmitted in the primary cell to schedule the PDSCH in the primary cell, implicitly allocates the first resource (first PUCCH resource) in association with the transmitted PDCCH. For example, the base station apparatus 100, when using the PDCCH transmitted in the primary cell to schedule the PDSCH in the primary cell, uses the first CCE (which may be the first CCE and the offset value) used in the transmission of the PDCCH to implicitly allocate the first resource.

Furthermore, in FIG. 10, the base station apparatus 100, when using the PDCCH transmitted in the secondary cell 2 to schedule the PDSCH in the secondary cell, previously and explicitly sets the resource (PUCCH resource) for the mobile station apparatus 200.

For example, in FIG. 10, the base station apparatus 100, when using the PDCCH transmitted in the secondary cell 1 to schedule the PDSCH in the secondary cell 1, explicitly sets the second resource (second PUCCH resource) using the RRC signaling. Furthermore, when the base station apparatus 100 previously uses the RRC signaling to set the candidates of the second resource for the mobile station apparatus 200, and uses the PDCCH transmitted in the secondary cell 1 to schedule the PDSCH in the secondary cell 1, the base station apparatus 100 can explicitly indicate, with the resource indication information (ARI) transmitted in the PDCCH, the actually allocated second resource.

Moreover, for example, the base station apparatus 100, when using the PDCCH transmitted in the secondary cell 2 to schedule the PDSCH in the secondary cell 2, explicitly sets the third resource (third PUCCH resource) using the RRC signaling. In addition, when the base station apparatus 100 previously uses the RRC signaling to set the candidates of the third resource for the mobile station apparatus 200, and uses the PDCCH transmitted in the secondary cell 2 to schedule the PDSCH in the secondary cell 2, the base station apparatus 100 can explicitly indicate, with the resource indication information (ARI) transmitted in the PDCCH, the actually allocated third resource.

As has been described above, in FIG. 10, when the base station apparatus 100 sets, as the downlink transmission mode for the primary cell, the Non-MIMO mode, and uses the PDCCH (downlink assignment) transmitted in the primary cell to schedule the PDSCH (the transmission of one transport block using the PDSCH) in the primary cell, the base station apparatus 100 implicitly allocates the first resource (one PUCCH resource).

In other words, when the base station apparatus 100 schedules the PDSCH (the transmission of one transport block using the PDSCH) in the cell where the Non-MIMO mode is set using the PDCCH (downlink assignment) transmitted in the primary cell, the base station apparatus 100 implicitly sets one PUCCH resource.

Moreover, when the base station apparatus 100 sets the Non-MIMO mode as the downlink transmission mode for the secondary cell 1, and schedules the PDSCH (the transmission of up to two transport blocks using the PDSCH) in the secondary cell 1 using the PDCCH (downlink assignment) transmitted in the secondary cell 1, the base station apparatus 100 explicitly sets the second resource (one PUCCH resource).

Furthermore, when the base station apparatus 100 sets the Non-MIMO mode as the downlink transmission mode for the secondary cell 2, and schedules the PDSCH (the transmission of one transport block using the PDSCH) in the secondary cell 2 using the PDCCH (downlink assignment) transmitted in the secondary cell 2, the base station apparatus 100 explicitly sets the third resource (one PUCCH resource) to the mobile station apparatus 200.

In other words, when the base station apparatus 100 schedules the PDSCH (the transmission of one transport block using the PDSCH) in the cell where the Non-MIMO mode is set using the PDCCH (downlink assignment) transmitted in the secondary cell, the base station apparatus 100 explicitly sets one PUCCH resource.

Furthermore, when the base station apparatus 100 sets the Non-MIMO mode as the downlink transmission mode for each of the secondary cell 1 and the secondary cell 2, and schedules the PDSCH in the secondary cell using the PDCCH transmitted in the secondary cell, the base station apparatus 100 explicitly sets the second resource and the third resource (two PUCCH resources).

In other words, when the base station apparatus 100 schedules each of the PDSCHs (the transmission of one transport block using the PDSCH) in a plurality of cells where the Non-MIMO mode is set using the PDCCH (downlink assignment) transmitted in the secondary cell, the base station apparatus 100 explicitly sets as many PUCCH resources as the transport blocks (which may be code words, the number of code words or the number of transport blocks) transmitted in the PDSCH scheduled by the PDCCH transmitted in the secondary cell.

Here, in FIG. 10, the first resource can be associated with, for example, the resource 1 in the three-bit ACK/NACK table similar to the four-bit ACK/NACK table shown in FIG. 5. In addition, the second resource can be associated with, for example, the resource 2 in the three-bit ACK/NACK table similar to the four-bit ACK/NACK table shown in FIG. 5. Moreover, the third resource can be associated with, for example, the resource 3 in the three-bit ACK/NACK table similar to the four-bit ACK/NACK table shown in FIG. 5. As described above, the mobile station apparatus 200 uses the channel selection to transmit the information indicating the ACK/NACKs for a plurality of transport blocks transmitted from the base station apparatus 100 in the same subframe.

Figure 11:
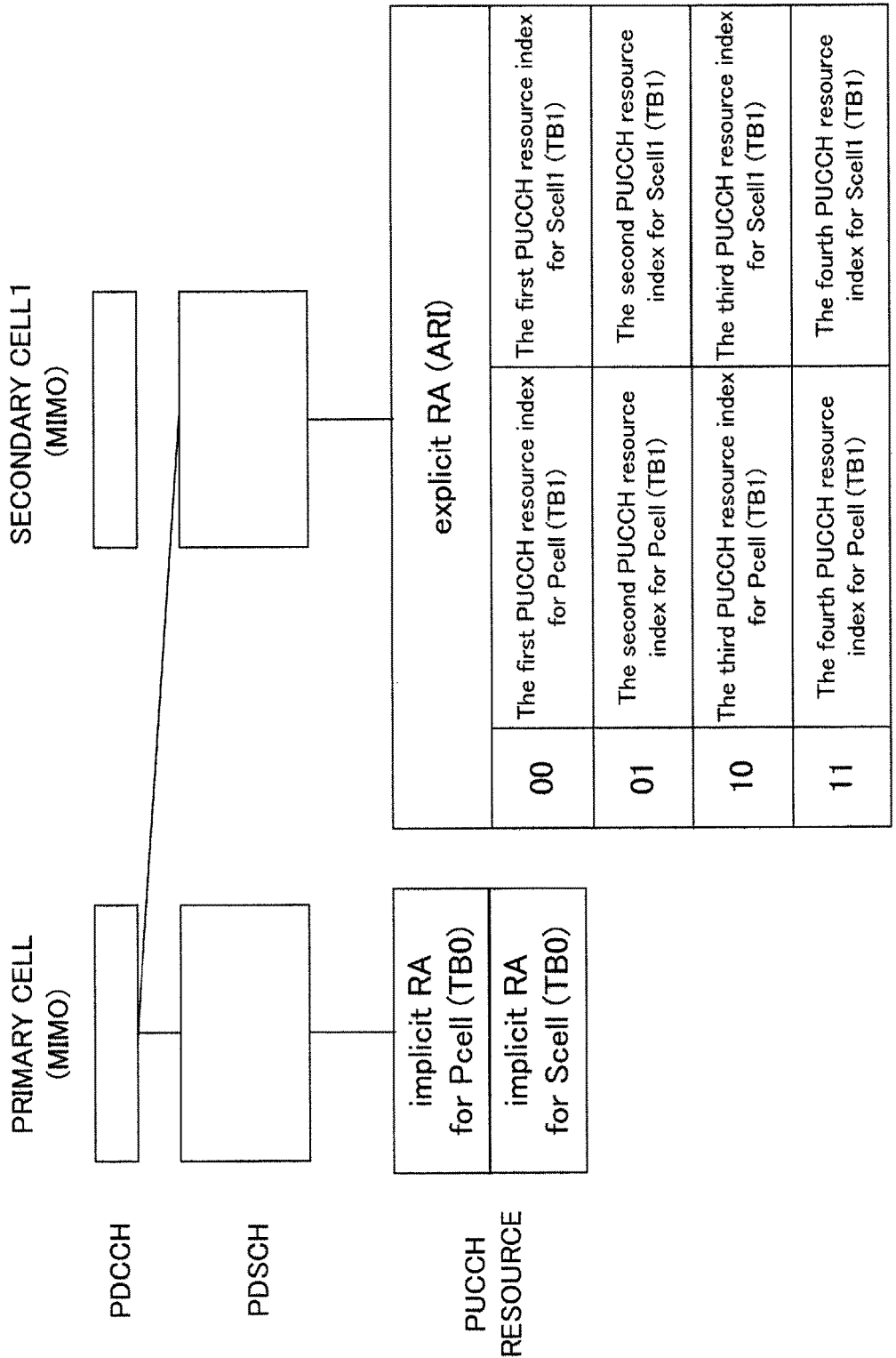
FIG. 11 is another diagram illustrating the resource allocation by the base station apparatus 100 of the first embodiment.

FIG. 11 is a diagram illustrating the resource allocation by the base station apparatus 100 when the mobile station apparatus 200 transmits the information indicating the ACK/NACK. FIG. 11 shows that the base station apparatus 100 sets the two cells (the primary cell and the secondary cell 1) for the mobile station apparatus 200. In addition, FIG. 11 also shows that the base station apparatus 100 sets, for the mobile station apparatus 200, as the downlink transmission mode for each cell, the MIMO mode for the primary cell and the MIMO mode for the secondary cell 1.

In other words, the mobile station apparatus 200 transmits the information indicating ACK/NACKs for up to two transport blocks transmitted from the base station apparatus 100 in the PDSCH in the primary cell and up to two transport blocks transmitted in the PDSCH in the secondary cell 1.

FIG. 11 shows that the base station apparatus 100 uses the PDCCH (downlink assignment) in the primary cell to schedule the PDSCH (the transmission of up to two transport blocks using the PDSCH) in the primary cell. Moreover, FIG. 11 also shows that the base station apparatus 100 uses the PDCCH (downlink assignment) in the primary cell to schedule the PDSCH (the transmission of up to two transport blocks using the PDSCH) in the secondary cell 1.

Here, in FIG. 11, the base station apparatus 100, when using the PDCCH transmitted in the primary cell to schedule the PDSCH in the primary cell, implicitly allocates the first resource (first PUCCH resource) in association with the transmitted PDCCH. For example, the base station apparatus 100, when using the PDCCH transmitted in the primary cell to schedule the PDSCH in the primary cell, uses the first CCE (which may be the first CCE and the offset value) used in the transmission of the PDCCH to implicitly allocate the first resource.

Furthermore, in FIG. 11, the base station apparatus 100, when using the PDCCH transmitted in the primary cell to schedule the PDSCH in the primary cell, previously and explicitly sets the second resource (second PUCCH resource) for the mobile station apparatus 200.

For example, the base station apparatus 100, when using the PDCCH transmitted in the primary cell to schedule the PDSCH in the primary cell, explicitly sets the second resource using the RRC signaling. In addition, when the base station apparatus 100 previously uses the RRC signaling to set the candidates of the second resource for the mobile station apparatus 200, and uses the PDCCH transmitted in the secondary cell to schedule the PDSCH in the secondary cell, the base station apparatus 100 can explicitly indicate, with the resource indication information (ARI) transmitted in the PDCCH, the actually allocated second resource.

Moreover, in FIG. 11, the base station apparatus 100, when using the PDCCH transmitted in the primary cell to schedule the PDSCH in the secondary cell 1, implicitly allocates the third resource (third PUCCH resource) in association with the transmitted PDCCH. For example, the base station apparatus 100, when using the PDCCH transmitted in the primary cell to schedule the PDSCH in the secondary cell, uses the first CCE (which may be the first CCE and the offset value) used in the transmission of the PDCCH to implicitly allocate the third resource.

Furthermore, in FIG. 11, the base station apparatus 100, when using the PDCCH transmitted in the secondary cell 1 to schedule the PDSCH in the secondary cell 1, previously and explicitly sets the fourth resource (fourth PUCCH resource) for the mobile station apparatus 200.

For example, the base station apparatus 100, when using the PDCCH transmitted in the secondary cell 1 to schedule the PDSCH in the secondary cell 1, explicitly sets the fourth resource using the RRC signaling. Furthermore, when the base station apparatus 100 previously uses the RRC signaling to set the candidates of the fourth resource for the mobile station apparatus 200, and uses the PDCCH transmitted in the secondary cell 1 to schedule the PDSCH in the secondary cell 1, the base station apparatus 100 can explicitly indicate, with the resource indication information (ARI) transmitted in the PDCCH, the actually allocated fourth resource.

As has been described above, in FIG. 11, when the base station apparatus 100 sets the MIMO mode as the downlink transmission mode for the primary cell, and uses the PDCCH (downlink assignment) transmitted in the primary cell to schedule the PDSCH (the transmission of up to two transport blocks using the PDSCH) in the primary cell, the base station apparatus 100 implicitly allocates the first resource (one PUCCH resource).

In other words, when the base station apparatus 100 schedules the PDSCH (the transmission of up to two transport blocks using the PDSCH) in the cell where the MIMO mode is set using the PDCCH (downlink assignment) transmitted in the primary cell, the base station apparatus 100 implicitly allocates one PUCCH resource.

In addition, when the base station apparatus 100 sets the MIMO mode as the downlink transmission mode for the primary cell, and schedules the PDSCH (the transmission of up to two transport blocks using the PDSCH) in the primary cell using the PDCCH (downlink assignment) transmitted in the primary cell, the base station apparatus 100 explicitly sets the second resource (one PUCCH resource).

That is, when the base station apparatus 100 schedules the PDSCH (the transmission of up to two transport blocks using the PDSCH) in the cell where the MIMO mode is set using the PDCCH (downlink assignment) transmitted in the primary cell, the base station apparatus 100 explicitly sets one PUCCH resource.

In other words, when the base station apparatus 100 schedules the PDSCH (the transmission of up to two transport blocks using the PDSCH) in the cell where the MIMO mode is set using the PDCCH (downlink assignment) transmitted in the primary cell, the base station apparatus 100 implicitly allocates one PUCCH resource and explicitly sets one PUCCH resource.

Moreover, when the base station apparatus 100 sets the MIMO mode as the downlink transmission mode for the secondary cell 1, and schedules the PDSCH (the transmission of one transport block using the PDSCH) in the secondary cell 1 using the PDCCH (downlink assignment) transmitted in the primary cell, the base station apparatus 100 implicitly allocates the third resource (one PUCCH resource).

In other words, when the base station apparatus 100 schedules the PDSCH (the transmission of up to two transport blocks using the PDSCH) in the cell where the MIMO mode is set using the PDCCH (downlink assignment) transmitted in the primary cell, the base station apparatus 100 implicitly allocates one PUCCH resource.

Furthermore, when the base station apparatus 100 sets the MIMO mode as the downlink transmission mode for the secondary cell 1, and schedules the PDSCH (the transmission of up to two transport blocks using the PDSCH) in the secondary cell 1 using the PDCCH (downlink assignment) transmitted in the primary cell, the base station apparatus 100 explicitly sets the fourth resource (one PUCCH resource).

In other words, when the base station apparatus 100 schedules the PDSCH (the transmission of up to two transport blocks using the PDSCH) in the cell where the MIMO mode is set using the PDCCH (downlink assignment) transmitted in the primary cell, the base station apparatus 100 explicitly sets one PUCCH resource.

That is, when the base station apparatus 100 schedules the PDSCH (the transmission of up to two transport blocks using the PDSCH) in the cell where the MIMO mode is set using the PDCCH (downlink assignment) transmitted in the primary cell, the base station apparatus 100 implicitly sets one PUCCH resource and explicitly sets one PUCCH resource.

In other words, when the base station apparatus 100 sets the MIMO mode as the downlink transmission mode for the primary cell, sets the MIMO mode as the downlink transmission mode for the secondary cell 1 and schedules the PDSCH in the primary cell and the secondary cell using the PDCCH transmitted in the primary cell, the base station apparatus 100 implicitly allocates the first resource and the third resource (two PUCCH resources).

Moreover, when the base station apparatus 100 sets the MIMO mode as the downlink transmission mode for the primary cell, sets the MIMO mode as the downlink transmission mode for the secondary cell 1 and schedules the PDSCH in the primary cell and the secondary cell using the PDCCH transmitted in the primary cell, the base station apparatus 100 explicitly sets the second resource and the fourth resource (two PUCCH resources).

In other words, when the base station apparatus 100 sets the MIMO mode as the downlink transmission mode for the primary cell and the secondary cell, and schedules the PDSCH in the primary cell and the secondary cell using the PDCCH (downlink assignment) transmitted in the primary cell, the base station apparatus 100 implicitly allocates as many PUCCH resources as the total number (that is, two) of one transport block (which may be code words, the number of code words or the number of transport blocks; for example, the first transport block) transmitted in the PDSCH in the primary cell and one transport block (which may be code words, the number of code words or the number of transport blocks; for example, the first transport block) transmitted in the PDSCH in the secondary cell.

Furthermore, when the base station apparatus 100 sets the MIMO mode as the downlink transmission mode for the primary cell and the secondary cell, and schedules the PDSCH in the secondary cell using the PDCCH (downlink assignment) transmitted in the secondary cell, the base station apparatus 100 explicitly sets as many PUCCH resources as the total number (that is, two) of one transport block (which may be code words, the number of code words or the number of transport blocks; for example, the second transport block) transmitted in the PDSCH in the primary cell and one transport block (which may be code words, the number of code words or the number of transport blocks; for example, the second transport block) transmitted in the PDSCH in the secondary cell.

Here, in FIG. 11, the first resource can be associated with the resource 1 in FIG. 5. In addition, the second resource can be associated with the resource 2 in FIG. 5. Moreover, the third resource can be associated with the resource 3 in FIG. 5. Furthermore, the fourth resource can be associated with the resource 4 in FIG. 5. As described above, the mobile station apparatus 200 uses the channel selection to transmit the information indicating the ACK/NACKs for a plurality of transport blocks transmitted from the base station apparatus 100 in the same subframe.

Figure 12:
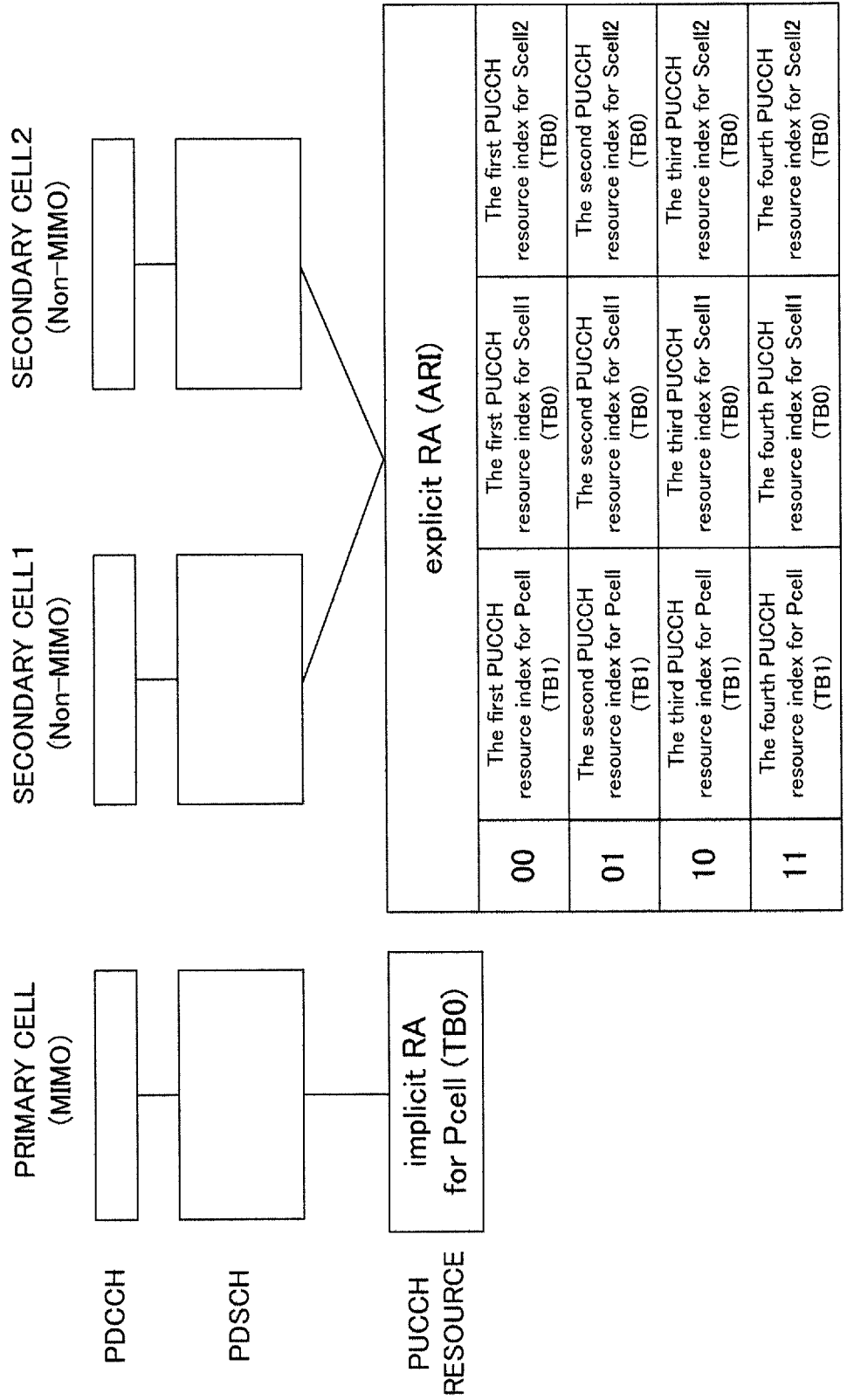
FIG. 12 is another diagram illustrating the resource allocation by the base station apparatus 100 of the first embodiment.

FIG. 12 is a diagram illustrating the resource allocation by the base station apparatus 100 when the mobile station apparatus 200 transmits the information indicating the ACK/NACK. FIG. 12 shows that the base station apparatus 100 sets the three cells (the primary cell, the secondary cell 1 and the secondary cell 2) for the mobile station apparatus 200. In addition, FIG. 12 also shows that the base station apparatus 100 sets, for the mobile station apparatus 200, as the downlink transmission mode for each cell, the MIMO mode for the primary cell, the Non-MIMO mode for the secondary cell 1 and the Non-MIMO mode for the secondary cell 2.

In other words, the mobile station apparatus 200 transmits the information indicating ACK/NACKs for up to two transport blocks transmitted from the base station apparatus 100 in the PDSCH in the primary cell, one transport block transmitted in the PDSCH in the secondary cell 1 and one transport block transmitted in the PDSCH in the secondary cell 2.

FIG. 12 shows that the base station apparatus 100 uses the PDCCH (downlink assignment) in the primary cell to schedule the PDSCH (the transmission of up to two transport blocks using the PDSCH) in the primary cell. Moreover, FIG. 12 also shows that the base station apparatus 100 uses the PDCCH (downlink assignment) in the secondary cell 1 to schedule the PDSCH (the transmission of one transport block using the PDSCH) in the secondary cell 1. Furthermore, FIG. 12 also shows that the base station apparatus 100 uses the PDCCH (downlink assignment) in the secondary cell 2 to schedule the PDSCH (the transmission of one transport block using the PDSCH) in the secondary cell 2.

Here, in FIG. 12, the base station apparatus 100, when using the PDCCH transmitted in the primary cell to schedule the PDSCH (the transmission of up to two transport blocks using the PDSCH) in the primary cell, implicitly allocates the first resource (first PUCCH resource) in association with the transmitted PDCCH. For example, the base station apparatus 100, when using the PDCCH transmitted in the primary cell to schedule the PDSCH in the primary cell, uses the first CCE (which may be the first CCE and the offset value) used in the transmission of the PDCCH to implicitly allocate the first resource.

In addition, in FIG. 12, the base station apparatus 100, when using the PDCCH transmitted in the primary cell to schedule the PDSCH (the transmission of up to two transport blocks using the PDSCH) in the primary cell, previously and explicitly sets the second resource (second PUCCH resource) for the mobile station apparatus 200.

For example, the base station apparatus 100, when using the PDCCH transmitted in the primary cell to schedule the PDSCH in the primary cell, explicitly sets the second resource using the RRC signaling. Moreover, when the base station apparatus 100 previously uses the RRC signaling to set the candidates of the second resource for the mobile station apparatus 200, and uses the PDCCH transmitted in the secondary cell to schedule the PDSCH in the secondary cell, the base station apparatus 100 can explicitly indicate, with the resource indication information (ARI) transmitted in the PDCCH, the actually allocated second resource.

Furthermore, in FIG. 12, the base station apparatus 100, when using the PDCCH transmitted in the secondary cell 1 to schedule the PDSCH in the secondary cell 1, explicitly sets the third resource (third PUCCH resource).

Furthermore, in FIG. 12, the base station apparatus 100, when using the PDCCH transmitted in the secondary cell 2 to schedule the PDSCH in the secondary cell 2, explicitly sets the fourth resource (fourth PUCCH resource).

In other words, the base station apparatus 100 explicitly sets, for the mobile station apparatus 200, the second resource, the third resource and the fourth resource using the RRC signaling. In addition, the base station apparatus 100 previously uses the RRC signaling to set the candidates of the second resource, the third resource and the fourth resource for the mobile station apparatus 200, and can indicate, with the ARI transmitted in the PDCCH (downlink assignment), the actually allocated second, third and fourth resources.

Here, it may be assumed that, in the mobile station apparatus 200, the same value is set at the ARI transmitted from the base station apparatus 100 in the PDCCH in the secondary cell. Moreover, when the mobile station apparatus 200 detects DTX (Discontinuous Transmission) for the PDCCH (downlink assignment) transmitted from the base station apparatus 100 in the secondary cell (when the mobile station apparatus 200 cannot detect the PDCCH transmitted from the base station apparatus 100 in the secondary cell or when the mobile station apparatus 200 cannot detect all the PDCCHs transmitted from the base station apparatus 100 in the secondary cell), the mobile station apparatus 200 may use the resource (first resource) implicitly allocated in association with the PDCCH transmitted from the base station apparatus 100 in the primary cell to transmit the information indicating the ACK/NACK.

In this case, for example, the mobile station apparatus 200 applies the channel selection, selects the first resource and thereby can transmit the information indicating the ACK/NACK. Moreover, in this case, for example, the mobile station apparatus 200 uses (without applying the channel selection) the first resource, and thereby can transmit the information indicating the ACK/NACK.

As has been described above, in FIG. 12, when the base station apparatus 100 sets the MIMO mode as the downlink transmission mode for the primary cell, and uses the PDCCH (downlink assignment) transmitted in the primary cell to schedule the PDSCH (the transmission of up to two transport blocks using the PDSCH) in the primary cell, the base station apparatus 100 implicitly allocates the first resource (one PUCCH resource).

Furthermore, when the base station apparatus 100 sets the MIMO mode as the downlink transmission mode for the primary cell, and schedules the PDSCH (the transmission of up to two transport blocks using the PDSCH) in the primary cell using the PDCCH (downlink assignment) transmitted in the primary cell, the base station apparatus 100 explicitly sets the second resource (one PUCCH resource).

In other words, when the base station apparatus 100 schedules the PDSCH (the transmission of up to two transport blocks using the PDSCH) in the cell where the MIMO mode is set using the PDCCH (downlink assignment) transmitted in the primary cell, the base station apparatus 100 explicitly sets one PUCCH resource.

That is, when the base station apparatus 100 schedules the PDSCH (the transmission of up to two transport blocks using the PDSCH) in the cell where the MIMO mode is set using the PDCCH (downlink assignment) transmitted in the primary cell, the base station apparatus 100 implicitly allocates one PUCCH resource and explicitly sets one PUCCH resource.

In addition, when the base station apparatus 100 sets the Non-MIMO mode as the downlink transmission mode for the secondary cell 1, and schedules the PDSCH (the transmission of one transport block using the PDSCH) in the secondary cell 1 using the PDCCH (downlink assignment) transmitted in the secondary cell 1, the base station apparatus 100 explicitly sets the third resource (one PUCCH resource).

Furthermore, when the base station apparatus 100 sets the Non-MIMO mode as the downlink transmission mode for the secondary cell 2, and schedules the PDSCH (the transmission of one transport block using the PDSCH) in the secondary cell 2 using the PDCCH (downlink assignment) transmitted in the secondary cell 2, the base station apparatus 100 explicitly sets the fourth resource (one PUCCH resource).

In other words, when the base station apparatus 100 schedules the PDSCH (the transmission of one transport block using the PDSCH) in the cell where the Non-MIMO mode is set using the PDCCH (downlink assignment) transmitted in the secondary cell, the base station apparatus 100 explicitly sets one PUCCH resource.

That is, when the base station apparatus 100 sets the MIMO mode as the downlink transmission mode for the primary cell, sets the Non-MIMO mode as the downlink transmission mode for the secondary cell 1 and the secondary cell 2 and schedules the PDSCH in the secondary cell using the PDCCH transmitted in the secondary cell, the base station apparatus 100 explicitly sets the second resource, the third resource and the fourth resource (three PUCCH resources).

In other words, when the base station apparatus 100 sets the MIMO mode as the downlink transmission mode for the primary cell, and schedules the PDSCH in the primary cell using the PDCCH (downlink assignment) transmitted in the primary cell, the base station apparatus 100 implicitly allocates as many PUCCH resources as (that is, one PUCCH resource) one transport block (which may be code words, the number of code words or the number of transport blocks; for example, the first transport block) transmitted in the PDSCH in the primary cell.

Moreover, when the base station apparatus 100 sets the MIMO mode as the downlink transmission mode for the primary cell, and schedules the PDSCH in the secondary cell using the PDCCH (downlink assignment) transmitted in the secondary cell, the base station apparatus 100 explicitly sets as many PUCCH resources as the total number of one transport block (which may be code words, the number of code words or the number of transport blocks; for example, the second transport block) transmitted in the PDSCH in the primary cell and one transport block (which may be code words, the number of code words or the number of transport blocks; for example, the first transport block and the second transport block) transmitted in the PDSCH in the secondary cell.

That is, when the base station apparatus 100 sets the MIMO mode as the downlink transmission mode for the primary cell, and schedules the PDSCH in the secondary cell using the PDCCH (downlink assignment) transmitted in the secondary cell, the base station apparatus 100 explicitly sets the PUCCH resource of the code word+1 transmitted in the PDSCH scheduled by the PDCCH transmitted in the secondary cell.

Here, in FIG. 12, the first resource can be associated with the resource 1 in FIG. 5. Furthermore, the second resource can be associated with the resource 2 in FIG. 5. In addition, the third resource can be associated with the resource 3 in FIG. 5. Moreover, the fourth resource can be associated with the resource 4 in FIG. 5. As described above, the mobile station apparatus 200 uses the channel selection to transmit the information indicating the ACK/NACKs for a plurality of transport blocks transmitted from the base station apparatus 100 in the same subframe.

As described above, for example, the base station apparatus 100 sets three cells for the mobile station apparatus 200, and sets the downlink transmission mode for each cell; the mobile station apparatus 200 determines (assumes) that four resources are allocated by the base station apparatus 100 from the cell set by the base station apparatus 100 and the downlink transmission mode for each cell.

In other words, the mobile station apparatus 200 can determine the number of resources (the number of PUCCH resources) allocated by the base station apparatus 100 from the cell (which may be the number of cells) set by the base station apparatus 100 and the downlink transmission mode for each cell.

The base station apparatus 100 sets, for the mobile station apparatus 200, the downlink transmission mode for each cell, and uses the PDCCH (downlink assignment) transmitted in the primary cell to schedule the PDSCH in the primary cell and/or the secondary cell; the mobile station apparatus 200 determines the number of resources implicitly allocated by the base station apparatus 100 from the PDSCH in the primary cell and/or the secondary cell scheduled by the PDCCH transmitted in the primary cell.

In other words, the mobile station apparatus 200 can determine the number of resources implicitly allocated by the base station apparatus 100 from the transport block (which may be code words, the number of code words or the number of transport blocks; hereinafter simply referred to as the number of transport blocks) transmitted in the PDSCH scheduled by the PDCCH transmitted in the primary cell.

Here, as described above, the base station apparatus 100 schedules the PDSCH in the primary cell using the PDCCH (downlink assignment) in the primary cell. Furthermore, the base station apparatus 100 uses the RRC signaling, and thereby can set one serving cell where the PDCCH (downlink assignment) scheduling the PDSCH in the secondary cell is transmitted (can set link (linkage, linking) between the PDCCH and the PDSCH).

Furthermore, the base station apparatus 100 sets, for the mobile station apparatus 200, the downlink transmission mode for each cell, and uses the PDCCH (downlink assignment) transmitted in the secondary cell to schedule the PDSCH in the secondary cell; the mobile station apparatus 200 determines the number of resources explicitly allocated by the base station apparatus 100 from the PDSCH scheduled by the PDCCH transmitted in the secondary cell.

In other words, the mobile station apparatus 200 can determine the number of resources explicitly allocated by the base station apparatus 100 from the number of transport blocks transmitted in the PDSCH scheduled by the PDCCH transmitted from the base station apparatus 100 in the secondary cell.

Here, as described above, the base station apparatus 100 uses the RRC signaling, and thereby can set one serving cell where the PDCCH (downlink assignment) scheduling the PDSCH in the secondary cell is transmitted (can set link (linkage, linking) between the PDCCH and the PDSCH).

In other words, when the resource is indicated by the ARI from the base station apparatus 100, the mobile station apparatus 200 can determine how many resource candidates are set as the candidates of the resource different for each secondary cell, from the number of transport blocks transmitted in the PDSCH scheduled by the PDCCH transmitted from the base station apparatus 100 in the secondary cell.

In addition, when the resource is indicated by the ARI from the base station apparatus 100, the mobile station apparatus 200 can determine how many resource candidates are set as the candidates of the resource common in the secondary cell, from the number of transport blocks transmitted in the PDSCH scheduled by the PDCCH transmitted from the base station apparatus 100 in the secondary cell.

Moreover, when the resource is indicated by the ARI from the base station apparatus 100, the mobile station apparatus 200 can determine how many resources are included in the resource group including a plurality of resources indicated, from the number of transport blocks transmitted in the PDSCH scheduled by the PDCCH transmitted from the base station apparatus 100 in the secondary cell.

Here, the number of resources explicitly allocated by the base station apparatus 100 can be determined by subtracting the number of resources implicitly allocated by the base station apparatus 100 from the number of resources allocated by the base station apparatus 100. In other words, the mobile station apparatus 200 can determine the number of resources explicitly allocated by the base station apparatus 100 from the cell set by the base station apparatus 100, the downlink transmission mode for each cell and the number of transport blocks transmitted in the PDSCH scheduled by the PDCCH transmitted in the primary cell.

In other words, when the resource is indicated by the ARI from the base station apparatus 100, the mobile station apparatus 200 can determine how many resource candidates are set as the candidates of the resource different for each secondary cell, from the cell set by the base station apparatus 100, the downlink transmission mode for each cell and the number of transport blocks transmitted in the PDSCH scheduled by the PDCCH transmitted in the primary cell.

Furthermore, when the resource is indicated by the ARI from the base station apparatus 100, the mobile station apparatus 200 can determine how many resource candidates are set as the candidates of the resource common in the secondary cell, from the cell set by the base station apparatus 100, the downlink transmission mode for each cell and the number of transport blocks transmitted in the PDSCH scheduled by the PDCCH transmitted in the primary cell.

In addition, when the resource is indicated by the ARI from the base station apparatus 100, the mobile station apparatus 200 can determine how many resources are included in the resource group including a plurality of resources indicated, from the cell set by the base station apparatus 100, the downlink transmission mode for each cell and the number of transport blocks transmitted in the PDSCH scheduled by the PDCCH transmitted in the primary cell.

Moreover, the number of resources explicitly allocated by the base station apparatus 100 can be determined by subtracting the number of transport blocks transmitted in the PDSCH in the secondary cell scheduled by the PDCCH transmitted from the base station apparatus 100 in the primary cell from the number of transport blocks transmitted in the PDSCH in the secondary cell scheduled by the PDCCH transmitted from the base station apparatus 100 in the primary cell and/or the secondary cell. In other words, the mobile station apparatus 200 can determine the number of resources explicitly allocated by the base station apparatus 100 from the number of transport blocks transmitted in the PDSCH in the secondary cell scheduled by the PDCCH transmitted from the base station apparatus 100 in the primary cell and/or the secondary cell and the number of transport blocks transmitted in the PDSCH in the secondary cell scheduled by the PDCCH transmitted from the base station apparatus 100 in the primary cell.

In other words, when the resource is indicated by the ARI from the base station apparatus 100, the mobile station apparatus 200 can determine how many resource candidates are set as the candidates of the resource different for each secondary cell, from the number of transport blocks transmitted in the PDSCH in the secondary cell scheduled by the PDCCH transmitted from the base station apparatus 100 in the primary cell and/or the secondary cell and the number of transport blocks transmitted in the PDSCH in the secondary cell scheduled by the PDCCH transmitted from the base station apparatus 100 in the primary cell.

Furthermore, when the resource is indicated by the ARI from the base station apparatus 100, the mobile station apparatus 200 can determine how many resource candidates are set as the candidates of the resource common in the secondary cell, from the number of transport blocks transmitted in the PDSCH in the secondary cell scheduled by the PDCCH transmitted from the base station apparatus 100 in the primary cell and/or the secondary cell and the number of transport blocks transmitted in the PDSCH in the secondary cell scheduled by the PDCCH transmitted from the base station apparatus 100 in the primary cell.

In addition, when the resource is indicated by the ARI from the base station apparatus 100, the mobile station apparatus 200 can determine how many resources are included in the resource group including a plurality of resources indicated, from the number of transport blocks transmitted in the PDSCH in the secondary cell scheduled by the PDCCH transmitted from the base station apparatus 100 in the primary cell and/or the secondary cell and the number of transport blocks transmitted in the PDSCH in the secondary cell scheduled by the PDCCH transmitted from the base station apparatus 100 in the primary cell.

As described above, when the base station apparatus 100 applies the MIMO SM to transmit the downlink transport block, the mobile station apparatus 200 determines the resources (the number of resources) allocated by the base station apparatus 100 and/or the resources (the number of resources) implicitly allocated by the base station apparatus 100 and/or the resources (the number of resources) explicitly allocated by the base station apparatus 100 from the set cells (the number of cells) and/or the downlink transmission mode for each cell and/or the number of transport blocks transmitted in the PDSCH scheduled using the PDCCH (downlink assignment) transmitted in the primary cell and/or the number of transport blocks transmitted in the PDSCH scheduled using the PDCCH (downlink assignment) transmitted in the secondary cell, and thus the base station apparatus 100 can efficiently allocate the uplink resources for transmitting the information indicating the ACK/NACK for the downlink data.

In other words, the base station apparatus 100 does not need to indicate the number of resources allocated to the mobile station apparatus 200, and thus it is possible to efficiently allocate the uplink resources for transmitting the information indicating the ACK/NACK for the downlink transport block. Moreover, the base station apparatus 100 does not need to indicate the number of resources implicitly allocated to the mobile station apparatus 200, and thus it is possible to efficiently allocate the uplink resources for transmitting the information indicating the ACK/NACK for the downlink transport block. Furthermore, the base station apparatus 100 does not need to indicate the number of resources explicitly allocated to the mobile station apparatus 200, and thus it is possible to efficiently allocate the uplink resources for transmitting the information indicating the ACK/NACK for the downlink transport block.

The embodiment described above is also applied to an integrated circuit that is mounted in the base station apparatus 100 and the mobile station apparatus 200. In addition, in the embodiment described above, programs for realizing the individual functions of the base station apparatus 100 and the individual functions of the mobile station apparatus 200 may be recorded in a computer-readable recording medium, and the programs recorded in the recording medium are read and executed by a computer system, thereby controlling the base station apparatus 100 and the mobile station apparatus 200. Note that, the "computer system" described herein includes an OS and hardware such as a peripheral device.

Moreover, the "computer-readable recording medium" refers to a portable medium such as a flexible disc, a magneto-optical disc, a ROM or a CD-ROM or a storage device such as a hard disc incorporated in a computer system. Furthermore, examples of the "computer-readable recording medium" may include a product, such as a communication line, that holds a program shortly and dynamically when the program is transmitted through a network such as the Internet or a communication line such as a telephone line and a product, such as a volatile memory within a computer system serving as a server and a client, that holds a program for a constant period of time. Furthermore, the program described above may be designed to realize part of the functions described above or may be designed such that the functions described above can be realized by combination with the program already recorded in the computer system.

Although the embodiment of the present invention has been described in detail above with reference to the drawings, the specific configuration is not limited to what has been described above. Designs and the like without departing from the spirit of the present invention are also included in the scope of claims.

DESCRIPTION OF SYMBOLS 100 base station apparatus
101 data control unit
102 transmission data modulation unit
103 radio unit
104 scheduling unit
105 channel estimation unit
106 reception data demodulation unit
107 data extraction unit
108 higher layer
109 antenna
110 radio resource control unit
200, 200-1 to 200-3 mobile station apparatus
201 data control unit
202 transmission data modulation unit
203 radio unit
204 scheduling unit
205 channel estimation unit
206 reception data demodulation unit
207 data extraction unit
208 higher layer
209 antenna
210 radio resource control unit

The invention claimed is:

1. A mobile station apparatus that communicates with a base station apparatus on a primary cell and a secondary cell, the mobile station apparatus comprising:
receiving circuitry configured to:
receive, in a first subframe, first downlink control information, the first downlink control information being received on a first physical downlink control channel,
receive, in the first subframe, second downlink control information, including first information, the second downlink control information being received on a second physical downlink control channel,
receive, in the first subframe, a first physical downlink shared channel transmission, and
receive, in the first subframe, a second physical downlink shared channel transmission; and
transmitting circuitry configured to transmit, in a second subframe, Hybrid Automatic Repeat Request (HARQ) control information using a physical uplink control channel resource, the physical uplink control channel resource being selected from a plurality of physical uplink control channel resources, the plurality of physical uplink control channel resources including a first physical uplink control channel resource, a second physical uplink control channel resource, a third physical uplink control channel resource, and a fourth physical uplink control channel resource, wherein the first physical uplink control channel resource and the second physical uplink control channel resource are determined based on a number of a first control channel element used for the first physical downlink control channel transmission, in a case that a transmission mode that supports up to two transport blocks is configured for the primary cell and the first physical downlink shared channel transmission is indicated by a detection of the first physical downlink control channel on the primary cell, and the third physical uplink control channel resource and the fourth physical uplink control channel resource are determined based on a single value of the first information included in the second downlink control information, in a case that the transmission mode that supports up to two transport blocks is configured for the secondary cell and the second physical downlink shared channel transmission is indicated by a detection of the second physical downlink control channel on the secondary cell.

2. The mobile station apparatus according to claim 1, wherein the third physical uplink control channel resource is determined from a first set of four physical uplink control channel resources, and the fourth physical uplink control channel resource is determined from a second set of four physical uplink control channel resources, the first set of four physical uplink control channel resources and the second set of four physical uplink control channel resources being configured using a radio resource control signal.

3. The mobile station apparatus according to claim 1, wherein the HARQ control information is used for indicating a positive acknowledgement (ACK) or a negative acknowledgement (NACK) for a transport block.

4. A communication method of a mobile station apparatus that communicates with a base station apparatus on a primary cell and a secondary cell, the communication method comprising:

receiving, in a first subframe, first downlink control information, the first downlink control information being received on a first physical downlink control channel;

receiving, in the first subframe, second downlink control information including first information, the second downlink control information being received on a second physical downlink control channel;

receiving, in the first subframe, a first physical downlink shared channel transmission;

receiving, in the first subframe, a second physical downlink shared channel transmission;

transmitting, in a second subframe, Hybrid Automatic Repeat Request (HARQ) control information using a physical uplink control channel resource, the physical uplink control channel resource being selected from a plurality of physical uplink control channel resources, the plurality of physical uplink control channel resources including a first physical uplink control channel resource, a second physical uplink control channel resource, a third physical uplink control channel resource, and a fourth physical uplink control channel resource; wherein the first physical uplink control channel resource and the second physical uplink control channel resource are determined based on a number of a first control channel element used for the first physical downlink control channel transmission, in a case that a transmission mode that supports up to two transport blocks is configured for the primary cell and the first physical downlink shared channel transmission is indicated by a detection of the first physical downlink control channel on the primary cell, and the third physical uplink control channel resource and the fourth physical uplink control channel resource are determined based on a single value of the first information included in the second downlink control information, in a case that a transmission mode that supports up to two transport blocks is configured for the second cell and the second physical downlink shared channel transmission is indicated by a detection of the second physical downlink control channel on the secondary cell.

5. The communication method according to claim 4, wherein the third physical uplink control channel resource is determined from a first set of four physical uplink control channel resources, and the fourth physical uplink control channel resource is determined from a second set of four physical uplink control channel resources, the first set of four physical uplink control channel resources and the second set of four physical uplink control channel resources being configured using a radio resource control signal.

6. The communication method according to claim 4, wherein the HARQ control information is used for indicating a positive acknowledgment (ACK) or a negative acknowledgment (NACK) for a transport block.

7. A base station apparatus that communicates with a mobile station apparatus on a primary cell and a secondary cell, the base station apparatus comprising:

transmitting circuitry configured to:

transmit, in a first subframe, first downlink control information, the first downlink control information being transmitted on a first physical downlink control channel, transmit, in the first subframe, second downlink control information including first information, the second downlink control information being transmitted on a second physical downlink control channel, transmit, in the first subframe, a first physical downlink shared channel transmission, and transmit, in the first subframe, a second physical downlink shared channel transmission; and receiving circuitry configured to receive, in a second subframe, Hybrid Automatic Repeat Request (HARQ) control information using a physical uplink control channel resource, the physical uplink control channel resource being selected from a plurality of physical uplink control channel resources, the plurality of physical uplink control channel resources including a first physical uplink control channel resource, a second physical uplink control channel resource, a third physical uplink control channel resource, and a fourth physical uplink control channel resource, wherein the first physical uplink control channel resource and the second physical uplink control channel resource are scheduled based on a number of a first control channel element used for the first physical downlink control channel transmission, in a case that a transmission mode that supports up to two transport blocks is configured for the primary cell and the first physical downlink shared channel transmission is indicated by the first physical downlink control channel on the primary cell, and the third physical uplink control channel resource and the fourth physical uplink control channel resource are scheduled based on a single value of the first information included in the second downlink control information, in a case that a transmission mode that supports up to two transport blocks is configured for the secondary cell and the second physical downlink shared channel transmission is indicated by the second physical downlink control channel on the secondary cell.

8. The base station apparatus according to claim 7, wherein
the third physical uplink control channel resource is scheduled from a first set of four physical uplink control channel resources, and the fourth physical uplink control channel resource is scheduled from a second set of four physical uplink control channel resources, the first set of four physical uplink control channel resources and the second set of four physical uplink control channel resources being configured using a radio resource control signal.

9. The base station apparatus according to claim 7, wherein
the HARQ control information is used for indicating a positive acknowledgment (ACK) or a negative acknowledgment (NACK) for a transport block.

10. A communication method of a base station apparatus that communicates with a mobile station apparatus on a primary cell and a secondary cell, the communication method comprising:
transmitting, in a first subframe, first downlink control information, the first downlink control information being transmitted on a first physical downlink control channel;
transmitting, in the first subframe, second downlink control information including first information, the second downlink control information being transmitted on a second physical downlink control channel;
transmitting, in the first subframe, a first physical downlink shared channel transmission;
transmitting, in the first subframe, a second physical downlink shared channel transmission; and
receiving in a second subframe, Hybrid Automatic Repeat Request (HARQ) control information using a physical uplink control channel resource, the physical uplink control channel resource being selected from a plurality of physical uplink control channel resources, the plurality of physical uplink control channel resources including a first physical uplink control channel resource, a second physical uplink control channel resource, a third physical uplink control channel resource, and a fourth physical uplink control channel resource; wherein
the first physical uplink control channel resource and the second physical uplink control channel resource are scheduled based on a number of a first control channel element used for the first physical downlink control channel transmission, in a case that a transmission mode that supports up to two transport blocks is configured for the primary cell and the first physical downlink shared channel transmission is indicated by the first physical downlink control channel on the primary cell, and
the third physical uplink control channel resource and the fourth physical uplink control channel resource are scheduled based on a single value of the first information included in the second downlink control information, in a case that a transmission mode that supports up to two transport blocks is configured for the secondary cell and the second physical downlink shared channel transmission is indicated by the second physical downlink control channel on the secondary cell.

11. The communication method according to claim 10, wherein
the third physical uplink control channel resource is scheduled from a first set of four physical uplink control channel resources, and the fourth physical uplink control channel resource is scheduled from a second set of four physical uplink control channel resources, the first set of four physical uplink control channel resources and the second set of four physical uplink control channel resources being configured using a radio resource control signal.

12. The communication method according to claim 10, wherein
the HARQ control information is used for indicating a positive acknowledgment (ACK) or a negative acknowledgment (NACK) for a transport block.

* * * * *